United States Patent
Nalawade et al.

(10) Patent No.: US 7,688,714 B2
(45) Date of Patent: *Mar. 30, 2010

(54) NETWORK ROUTING APPARATUS THAT PERFORMS SOFT GRACEFUL RESTART

(75) Inventors: Gargi Nalawade, San Jose, CA (US); Keyur Patel, San Jose, CA (US); Ruchi Kapoor, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 191 days.

This patent is subject to a terminal disclaimer.

(21) Appl. No.: 11/395,986

(22) Filed: Mar. 30, 2006

(65) Prior Publication Data

US 2006/0171404 A1    Aug. 3, 2006

Related U.S. Application Data

(63) Continuation-in-part of application No. 10/833,811, filed on Apr. 28, 2004.

(51) Int. Cl.
| | |
|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04L 12/28 | (2006.01) |
| H04L 12/56 | (2006.01) |
| G06F 15/173 | (2006.01) |

(52) U.S. Cl. .................. 370/217; 370/401; 709/239; 709/242

(58) Field of Classification Search .............. 370/401
See application file for complete search history.

(56) References Cited

U.S. PATENT DOCUMENTS 6,392,997 B1 * 5/2002 Chen .................... 370/252
7,359,377 B1 * 4/2008 Kompella et al. ......... 370/389

(Continued)

OTHER PUBLICATIONS

Sangli et al, Graceful Restart Mechanism for BGP, Jun. 2002, Internet Engineering Task Force, Network Working Group.*

(Continued)

*Primary Examiner*—William Trost, IV
*Assistant Examiner*—Andrew Chriss
(74) *Attorney, Agent, or Firm*—Hickman Palermo Truong & Becker LLP

(57) ABSTRACT

A network data packet routing apparatus with BGP is configured to soft reset an AFI or SAFI, so that forwarding on routes associated with the AFI or SAFI can continue even after an event or error. One approach involves establishing a Border Gateway Protocol (BGP) peering session between a first node and a second node in a packet-switched network; detecting a BGP condition requiring a reset of a BGP address family indicator (AFI) data structure or a sub-address family indicator (SAFI) data structure, wherein the BGP condition does not affect states of routes in the AFI or SAFI; preserving a BGP state and a forwarding state of the AFI or SAFI; and forwarding data on routes represented in the AFI or SAFI. Soft notification messaging and marking routes as stale facilitates the approach.

30 Claims, 14 Drawing Sheets

U.S. PATENT DOCUMENTS 7,362,700 B2 * 4/2008 Frick et al. .................. 370/219
2004/0078625 A1 * 4/2004 Rampuria et al. .............. 714/4

OTHER PUBLICATIONS

J. Reynolds et al., "Assigned Numbers," Internet Engineering Task Force (IETF) Network Working Group Request for Comments (RFC) 1700, Oct. 1994, pp. 1-215, published by The Internet Society.

Y. Rekhter et al., "A Border Gateway Protocol 4 (BGP-4)," IETF RFC 1771, Mar. 1995, pp. 1-54, published by The Internet Society.

T. Bates et al., "Multiprotocol Extensions for BGP-4," IETF RFC 2858, Jun. 2000, pp. 1-11, published by The Internet Society.

R. Chandra et al., "Capabilities Advertisement with BGP-4," IETF RFC 3392, Nov. 2002, pp. 1-6, published by The Internet Society.

G. Nalawade et al., "BGPv4 Soft-Notification Message," IETF Internet-Draft, Oct. 2003, pp. 1-9, published by The Internet Society.

Y. Rekhter et al., "A Border Gateway Protocol 4 (BGP-4)," IETF Internet-Draft, May 2004, pp. 1-95, published by The Internet Society.

S. Sangli et al., "Graceful Restart Mechanism for BGP," IETF RFC 4724, Jan. 2007, published by The Internet Society.

Sangli, Srihari et al., "Graceful Restart Mechanism for BGP Internet Engineering Task Force", Jun. 2002, 6 pages.

International Searching Authority, "International Search Report", foreing application No. PCT/US07/64368, dated Jun. 4, 2008, 10 pages.

* cited by examiner

| ADDRESS FAMILY IDENTIFIER (AFI)   612 |
|---|
| SUBSEQUENT ADDRESS FAMILY IDENTIFIER (SAFI)   614 |
| LENGTH OF NEXT HOP NETWORK ADDRESS   616 |
| NETWORK ADDRESS OF NEXT HOP   618 |
| ⋮ |

MP_REACH_NLRI PATH ATTRIBUTE   610

| ADDRESS FAMILY IDENTIFIER (AFI)   652 |
|---|
| SUBSEQUENT ADDRESS FAMILY IDENTIFIER (SAFI)   654 |
| WITHDRAWN ROUTES   656 |

MP_UNREACH_NLRI PATH ATTRIBUTE   650

FIG. 6

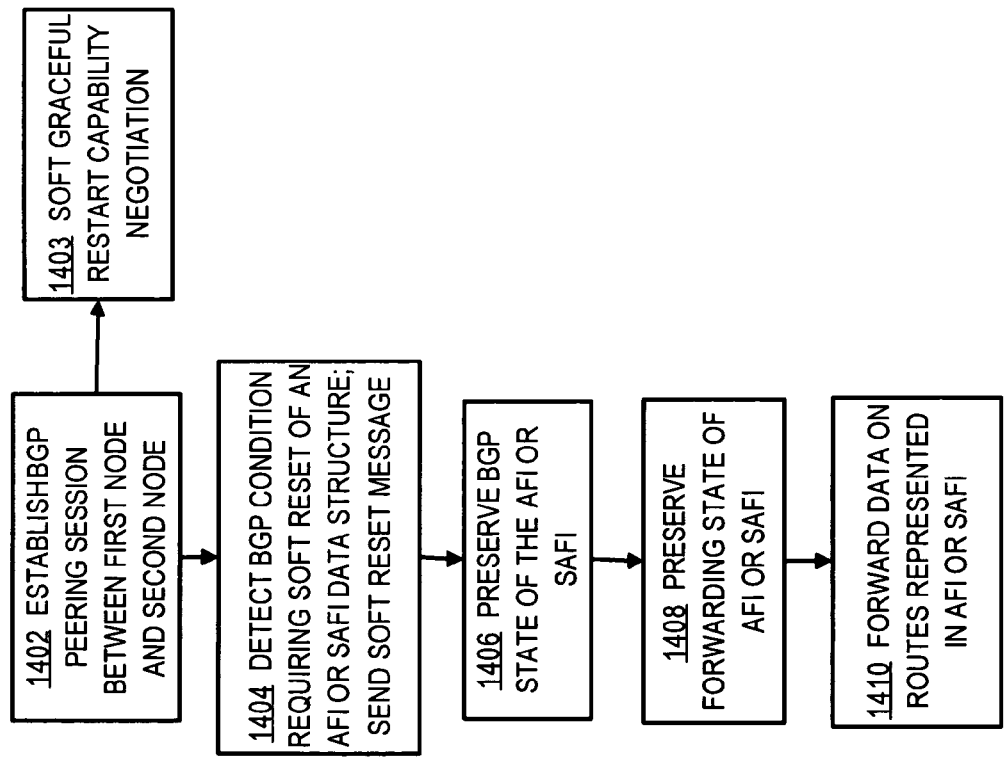

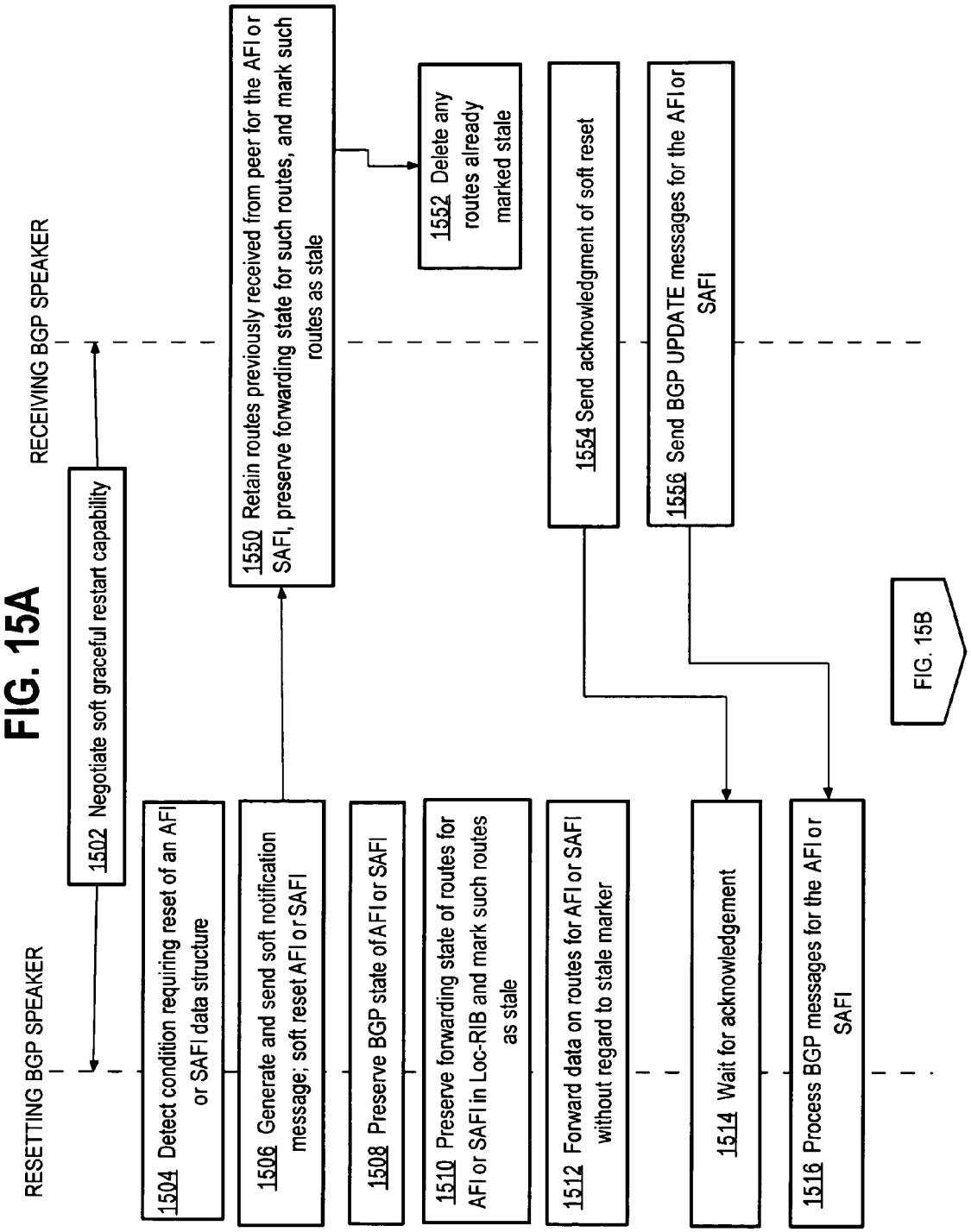

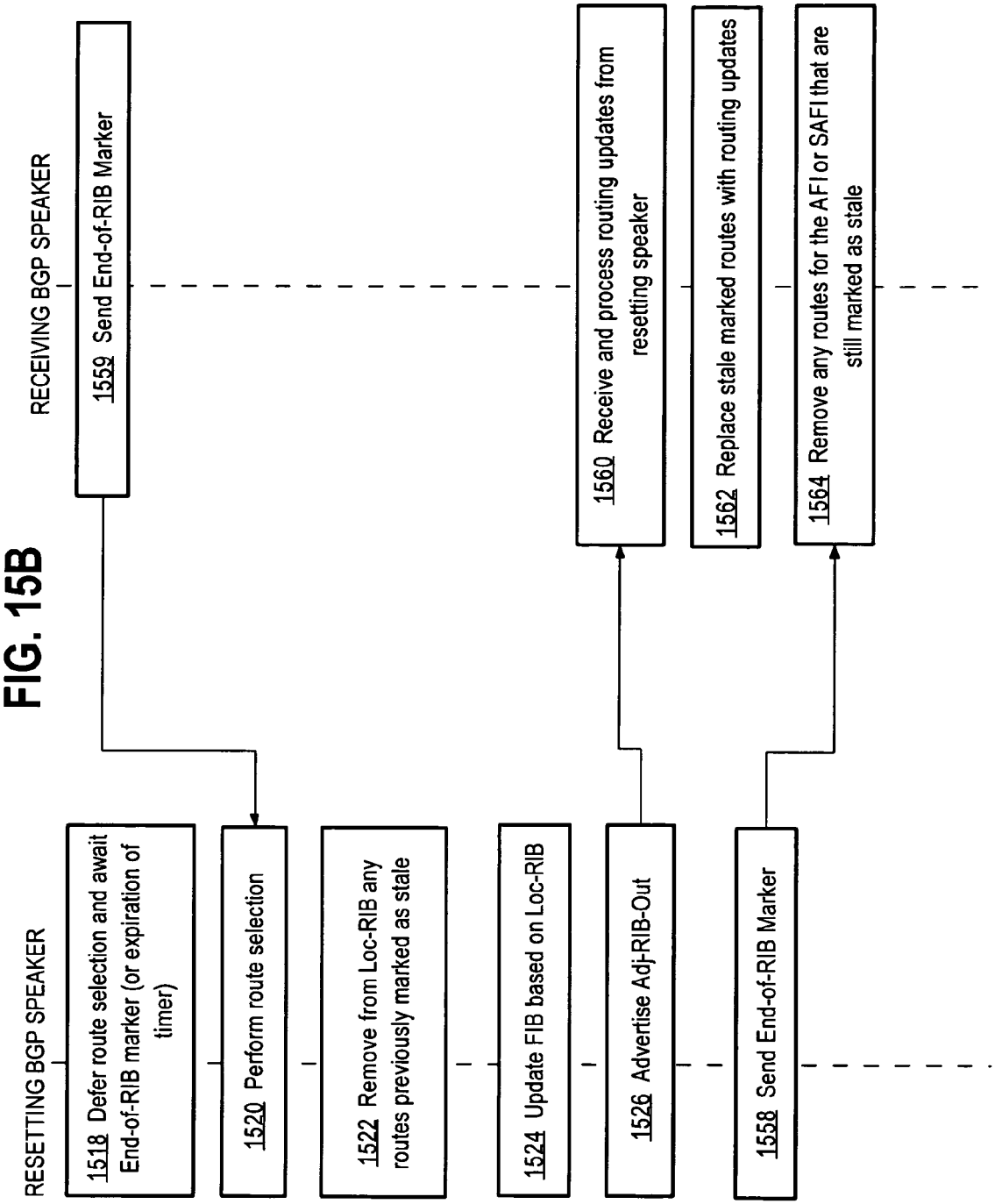

NETWORK ROUTING APPARATUS THAT PERFORMS SOFT GRACEFUL RESTART

PRIORITY CLAIM; CROSS-REFERENCE TO RELATED APPLICATIONS

This application claims domestic priority under 35 U.S.C. 120 as a Continuation-in-part of prior application Ser. No. 10/833,811 filed Apr. 28, 2004, the entire contents of which is hereby incorporated by reference as if fully set forth herein.

FIELD OF THE INVENTION

The invention relates generally to routing protocols used in computer networks. The invention relates more particularly to techniques for isolating the effect of a BGP AFI/SAFI reset in a network routing device.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

A computer network is a geographically distributed collection of interconnected communication links used to transport data between nodes, such as computers. Many types of computer networks are available, with the types ranging from local area networks to wide area networks. The nodes typically communicate by exchanging discrete packets or messages of data according to pre-defined protocols. In this context, a protocol consists of a set of rules defining how the nodes interact with each other.

Computer networks may be further interconnected by an intermediate node, such as a switch or router, to extend the effective "size" of each network. Since management of a large system of interconnected computer networks can prove burdensome, smaller groups of computer networks may be maintained as routing domains or autonomous systems. The networks within an autonomous system (AS) are typically coupled together by conventional "intradomain" routers. Yet it still may be desirable to increase the number of nodes capable of exchanging data; in this case, interdomain routers executing interdomain routing protocols are used to interconnect nodes of the various ASs.

An example of an interdomain routing protocol is the Border Gateway Protocol version 4 (BGP4), which performs routing between autonomous systems by exchanging routing information, e.g., network layer reachability information (NLRI), among neighboring interdomain routers of the systems. An adjacency is a relationship formed between selected neighboring (peer) routers for the purpose of exchanging routing information messages and abstracting the network topology. Before transmitting such messages, however, the peers cooperate to establish a logical "peer" connection (session) between the routers. BGP4 establishes reliable connections/sessions using a reliable/sequenced transport protocol, such as the Transmission Control Protocol (TCP).

The NLRI information exchanged by BGP peers typically includes destination address prefixes, i.e., the portions of destination addresses used by the routing protocol to render routing ("next hop") decisions. An example of such a destination address is the Internet Protocol (IP) version 4 (IPv4) address. A prefix implies a combination of an IP address and a mask that cooperate to describe an area of the network that a peer can reach. Each prefix may have a number of associated paths; each path is announced to a peer router by one or more of its peers. Note that the combination of a set of path attributes and a prefix is referred to as a "route"; the terms "route" and "path" may be used interchangeably herein. The BGP4 routing protocol standard is well known and is described in *Request For Comments* (*RFC*) 1771, by Y. Rekhter and T. Li (1995), *Internet Draft* <draft-ietf-idr-bgp4-23.txt> titled, *A Border Gateway Protocol 4* (*BGP-4*) by Y. Rekhter and T. Li (April 2003) and Interconnections, Bridges and Routers, by R. Perlman, published by Addison Wesley Publishing Company, at pages 323-329 (1992), all disclosures of which are hereby incorporated by reference.

BGP4 is generally capable of only carrying routing information for IPv4; accordingly, a multi-protocol extension to BGP4, referred to as BGP4+, extends BGP4 to allow carrying of routing information for multiple network layer protocols, such as IP version 6 (IPv6) and Internetwork Packet Exchange (IPX) addresses. BGP4+ extends BGP4 to associate these network layer protocols with next hop information and NLRI. Address Family Identifiers (AFIs) and Subsequent Address Family Identifiers (SAFIs) are used to identify the network layer protocols. BGP4+ and AFI/SAFI Address Family are well known and described in *RFC* 2858, by T. Bates et al. (2000) and *RFC* 1700 by J. Reynolds et al (1994), which are hereby incorporated by reference.

The interdomain routers configured to execute an implementation of the BGP protocol, referred to herein as BGP routers, perform various routing functions, including transmitting and receiving routing messages and rendering routing decisions based on routing metrics. The BGP protocol executing on each BGP router may be organized as a plurality of address family application modules, each of which is configured to provide an AFI/SAFI service such as IPv4/unicast, IPv4/multicast, IPv6/unicast or IPv6/multicast. Each AFI/SAFI service is enabled on a per peer basis by exchanging capabilities over the reliable BGP session between the router and its peer in accordance with Capabilities Advertisement with BGP4 described in RFC 3392 by R. Chandra et al (November 2002), which is hereby incorporated by reference. Two or more services may be enabled for two or more AFI/SAFI modules over the same BGP session and reliable transport.

Each BGP router also maintains a routing table that lists all feasible paths from that router to a particular network. The routing table is a database that contains routing information used to construct a forwarding table of a forwarding information base (FIB) that is used by the router when performing forwarding decisions on packets. Periodic refreshing of the routing table is generally not performed; however, BGP peer routers residing in the ASs exchange routing information under certain circumstances. For example, when a BGP router initially connects to the network, the peer routers exchange the entire contents of their routing tables. Thereafter when changes occur to those contents, the routers exchange only those portions of their routing tables that change in order to update their BGP peers' tables. These Update messages are thus incremental update messages sent in response to changes to the contents of the routing tables and announce only a best path to a particular network.

Broadly stated, a BGP router generates Update messages for an adjacency, also known as a peer router, by "walking-through" the routing table and applying appropriate routing policies. A routing policy is information that enables a BGP router to rank routes according to filtering and preference (i.e., the "best path"). Routing updates provided by the Update messages allows BGP routers of the ASs to construct a consistent view of the network topology. The Update messages are typically sent using a reliable transport, such as TCP, to ensure reliable delivery. TCP is a transport protocol implemented by a transport layer of the IP architecture; the term TCP/IP is commonly used to denote this architecture. The TCP/IP architecture is well known and described in *Computer Networks, 3rd Edition*, by Andrew S. Tanenbaum, published by Prentice-Hall (1996).

In particular, BGP peer routers use the Update messages to exchange routing information that is qualified by both AFI, such as IPv4, IPv6 or other address families, and SAFI, such as unicast, multicast or other applications, over a reliable BGP session. Often, an event may arise wherein a network administrator resets the BGP session for administrative reasons, e.g., to upgrade or enable a service of an AFI/SAFI module, or an error condition occurs with the module. The peers typically communicate the occurrence of the event or error condition through a conventional BGP Notification Message. However, a problem with the conventional Notification message is that it resets the BGP session (including reset of all the AFI/SAFI module services) and terminates the reliable transport between the routers. Thus, an event or error associated with one AFI/SAFI service provided over the transport penalizes all other services provided over that transport, resulting in routing "flaps" (streams of Update messages) for all AFI/SAFI modules supported by the peers.

One solution to this problem involves configuring multiple BGP sessions, one for each AFI/SAFI module or set of AFI/SAFI modules, between the peer routers. Each BGP session operates over a reliable (TCP connection) transport, typically by configuring multiple network layer (IP) addresses on each router and binding each session to a different IP address. Another solution involves multi-session BGP, wherein each of a plurality of BGP sessions is configured for each AFI/SAFI module or set of AFI/SAFI modules between a pair of BGP router peers. Here, rather than binding each session to a different IP address on each router, this approach shares an IP address over different sessions. However, each solution consumes resources (e.g., TCP bandwidth and associated control processing) that could be allocated more efficiently in the routers.

A related problem is that whenever a BGP session or an AFI/SAFI is reset, a BGP router flushes all the routes for that AFI/SAFI. When the routes are flushed, the router cannot forward traffic on those routes. However, the cause of the AFI/SAFI reset may not have affected the state of the routes in the Adj-RIB. This is especially true when the cause of the reset is expiration of a timer, exceeding the max-prefix-limit, etc. In these cases, a BGP protocol module may normally seek to reset all prefixes, but it is unnecessary to disrupt the forwarding plane for all prefixes due to the soft-reset of the AFI/SAFI.

BRIEF DESCRIPTION OF THE DRAWINGS

The invention may be better understood by referring to the following description in conjunction with the accompanying drawings in which like reference numbers indicate identical or functionally similar elements:

FIG. 6 is a schematic block diagram illustrating formats of MP REACH NLRI and MP UNREACH NLRI path attributes that may be advantageously used with the present invention;

FIG. 14 is a high-level flow diagram of an approach for performing soft graceful restart;

FIG. 15A and FIG. 15B are flow diagrams of steps performed in peer BGP network routing devices in an approach for performing soft graceful restart for an AFI/SAFI.

DETAILED DESCRIPTION

Figure 1:
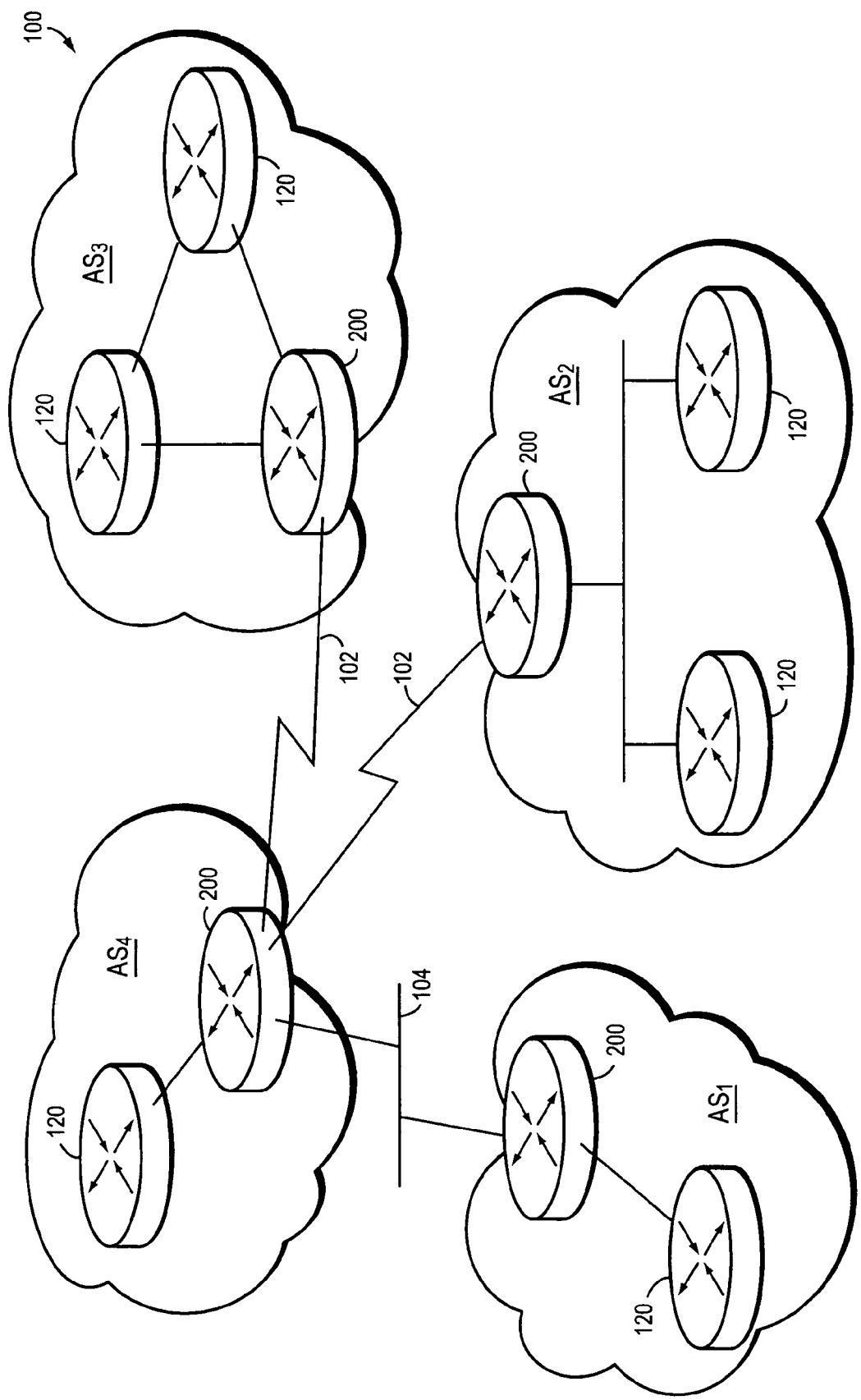
FIG. 1 is a schematic block diagram of a computer network comprising a plurality of routing domains interconnected by intermediate nodes, such as Border Gateway Protocol (BGP) interdomain routers.

A network routing apparatus that performs soft graceful restart is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:
   1.0 General Overview
   2.0 Soft Notification Messaging for a Routing Protocol
   3.0 Network Routing Apparatus With Soft Graceful Restart
      3.1 Overview
      3.2 Procedures for a Resetting Speaker and a Receiving Speaker
   4.0 Implementation Mechanisms-Hardware Overview
   5.0 Extensions and Alternatives 1.0 General Overview The needs identified in the foregoing Background, and other needs and objects that will become apparent for the following description, are achieved in the present invention, which comprises, in one aspect, a network data packet routing apparatus, comprising one or more processors; one or more interfaces that are communicatively coupled to the processors and to one or more other devices in a packet-switched network; one or more computer-readable media that are communicatively coupled to the one or more processors; one or more first sequences of instructions recorded on the computer-readable media which, when executed by the one or more processors, cause the one or more processors to interact with the other devices according to Border Gateway Protocol (BGP); one or more second sequences of instructions recorded on the computer-readable media which, when executed by the one or more processors, cause the one or more processors to perform: establishing a Border Gateway Protocol (BGP) peering session between a first node and a second node in a packet-switched network; detecting a BGP condition requiring a reset of a BGP address family indicator (AFI) data structure or a sub-address family indicator (SAFI) data structure, wherein the BGP condition does not affect states of routes in the AFI or SAFI; preserving a BGP state and a forwarding state of the AFI or SAFI; and forwarding data on routes represented in the AFI or SAFI.

In one feature, the BGP condition is any one of expiration of a timer, and exceeding a maximum number of allowed prefixes. In another feature, the processors and other devices negotiate a graceful restart capability with one or more of the other devices. In another feature, the processors perform negotiating a soft graceful restart capability with one or more of the other devices. In yet another feature, the second sequences of instructions further comprise instructions that cause the one or more processors to perform sending a soft notification message and soft resetting the AFI or SAFI in response to detecting the BGP condition.

In another feature, the processors perform, in response to detecting the BGP condition: sending a soft notification message; soft resetting the AFI or SAFI; marking routes associated with the AFI or SAFI as stale in a local routing information base (RIB); forwarding data to one or more of the other devices on routes associated with the AFI or SAFI even if such routes are marked as stale; receiving from one or more of the other devices, and processing, one or more BGP UPDATE messages associated with the AFI or SAFI; performing route selection; removing from the local RIB one or more routes previously marked as stale; updating a forwarding information base based on the local RIB; and advertising an external RIB to one or more of the other devices.

In yet another feature, the processors perform route selection only after receiving an End-of-RIB marker from one or more of the other devices.

In still a further feature, the one or more processors perform: receiving a soft notification message from a particular device among the other devices with which a BGP peering session has been established and that is resetting; retaining and marking as stale one or more routes previously received from the particular resetting device and associated with the AFI or SAFI; deleting from a routing information base one or more routes associated with the AFI or SAFI that have been previously marked as stale; sending one or more BGP update messages for the AFI or SAFI to the particular resetting device; receiving and processing one or more routing updates received from the particular resetting device; replacing the stale marked routes with the one or more routing updates; and removing one or more routes for the AFI or SAFI that are still marked as stale.

In yet another feature, the one or more processors perform sending an acknowledgment of the soft notification message.

In other aspects, the invention encompasses a method and a computer-readable medium configured to carry out the steps of the instructions referenced above.

The approach herein provides numerous improvements over prior approaches. First, the present approach allows the BGP Graceful Restart mechanism to cover BGP Notifications. If the BGP Notification message carries AFI/SAFI information, the approach herein allows the receiving BGP speaker to perform GR on AFI/SAFIs that are received in the BGP notification message. If the BGP Notification message does not carry AFI/SAFI information, the proposed mechanism extends GR to be performed across all the AFI/SAFI that were negotiated across the BGP session.

A primary benefit is that when a connection between two BGP peers is reset due to certain BGPv4 NOTIFICATION messages, the BGP peers need not delete their routing and forwarding tables because the notification error may not affect either routing or forwarding in any way. The approach herein extends the benefits of the existing GR mechanism to BGP connection resets that are due to such NOTIFICATIONS and to GR enabled SOFT-NOTIFY based peers. The approach herein implements the novel concept that even in the face of connection resets, the unaffected AFI/SAFIs do not face a route-churn after the session is re-initiated, because the GR procedures are followed only for the affected AFI/SAFI. Routing and forwarding for the other AFI/SAFIs is not affected.

The approach also optimizes the initial BGP table exchange between the peers, by limiting the table exchanges to affected AFI/SAFIs. If a BGP NOTIFICATION message carries an AFI/SAFI, the BGP speaker only marks routes of that AFI/SAFI as stale. The BGP tables of the other AFI/SAFI remain unaffected. After the session is re-established, the BGP speakers perform a full BGP table exchange only for the affected AFI/SAFIs. In this way, the initial table exchange is optimized. Any changes for the AFI/SAFIs that are not affected can be sent with incremental updates upon the re-establishment of a BGP session establishment. How to perform incremental updates is considered implementation specific and is outside the scope of this description.

The approach herein allows a BGP module in a router to perform graceful restart when a BGP AFI/SAFI is reset, either due to a NOTIFICATION received from the other side or due to a soft reset. Each soft reset is performed on a per peer, per AFI/SAFI basis. By performing graceful restart for an AFI/SAFI that is being soft reset, a BGP speaker can preserve the routing state and the forwarding state for that AFI/SAFI. The BGP peers exchange a new capability called the Soft-GR capability, which allows them to recognize if a peer can preserve the forwarding state for an AFI/SAFI that is soft-reset.

Based on the foregoing, embodiments provide numerous benefits including faster convergence after a BGP AFI/SAFI reset; less disruption of a network in the event of an AFI/SAFI reset; continuing forwarding uninterrupted for all of the prefixes in the BGP peers' tables, until a new update is exchanged; and allowing network service providers to offer high network reliability, even when unforeseen events cause an AFI/SAFI to be reset.

In another aspect, the present invention overcomes the disadvantages of the prior art by providing a soft notification technique that isolates address family application based errors or events occurring within a routing protocol, such as the Border Gateway Protocol (BGP), used to exchange routing information between a router and its peer router over a BGP session' operating on a reliable transport. The technique apportions the session into a plurality of logical subsets, each of which is associated with an address family application (AFI/SAFI) module of the BGP protocol executing on the routers. Novel BGP soft notification messaging is employed to allow the router to notify its peer of an isolated error condition or event associated with an AFI/SAFI module. Isolation of the error/event enables sending messages to cause restart ("soft reset") of only the associated API/SAFI module, thereby obviating the need to reset or terminate the entire BGP session and reliable transport between the router and peer. Notably, soft reset of the module occurs without disrupting services provided by other AFI/SAFI modules of the BGP protocol.

Advantageously, the inventive technique uses a single BGP session to exchange routing information related to different address family application (AFI/SAFI) modules to enable sharing of resources among the modules of the BGP protocol executing on the routers. Moreover, the soft notification technique logically separates the reliable transport from the AFI/SAFI modules to thereby allow scaling of BGP features and services over a single BGP session. Such logical separation allows a router to gracefully recover from an error condition and/or warn its peer about the occurrence of a BGP-related event pertaining to an AFI/SAFI module.

2.0 Soft Notification Messaging for a Routing Protocol

FIG. 1 is a schematic block diagram of a computer network 100 comprising a plurality of routing domains interconnected by intermediate nodes. The intermediate nodes may comprise conventional switches but, in the illustrative embodiment, are conventional intradomain routers 120 and interdomain routers 200. The routing domains or autonomous systems (AS 1-4) are interconnected by the interdomain routers. The interdomain routers 200 are further interconnected by networks, such as local area networks 104, and s point-to-point links 102, such as frame relay links, asynchronous transfer mode links or other serial links. Communication among the routers is typically effected by exchanging discrete data packets or messages in accordance with pre-defined protocols, such as the Transmission Control Protocol/Internet Protocol (TCP/IP). It will be understood to those skilled in the art that other protocols, such as the Internet Packet Exchange (IPX) protocol, may be advantageously used with the present invention.

Figure 2:
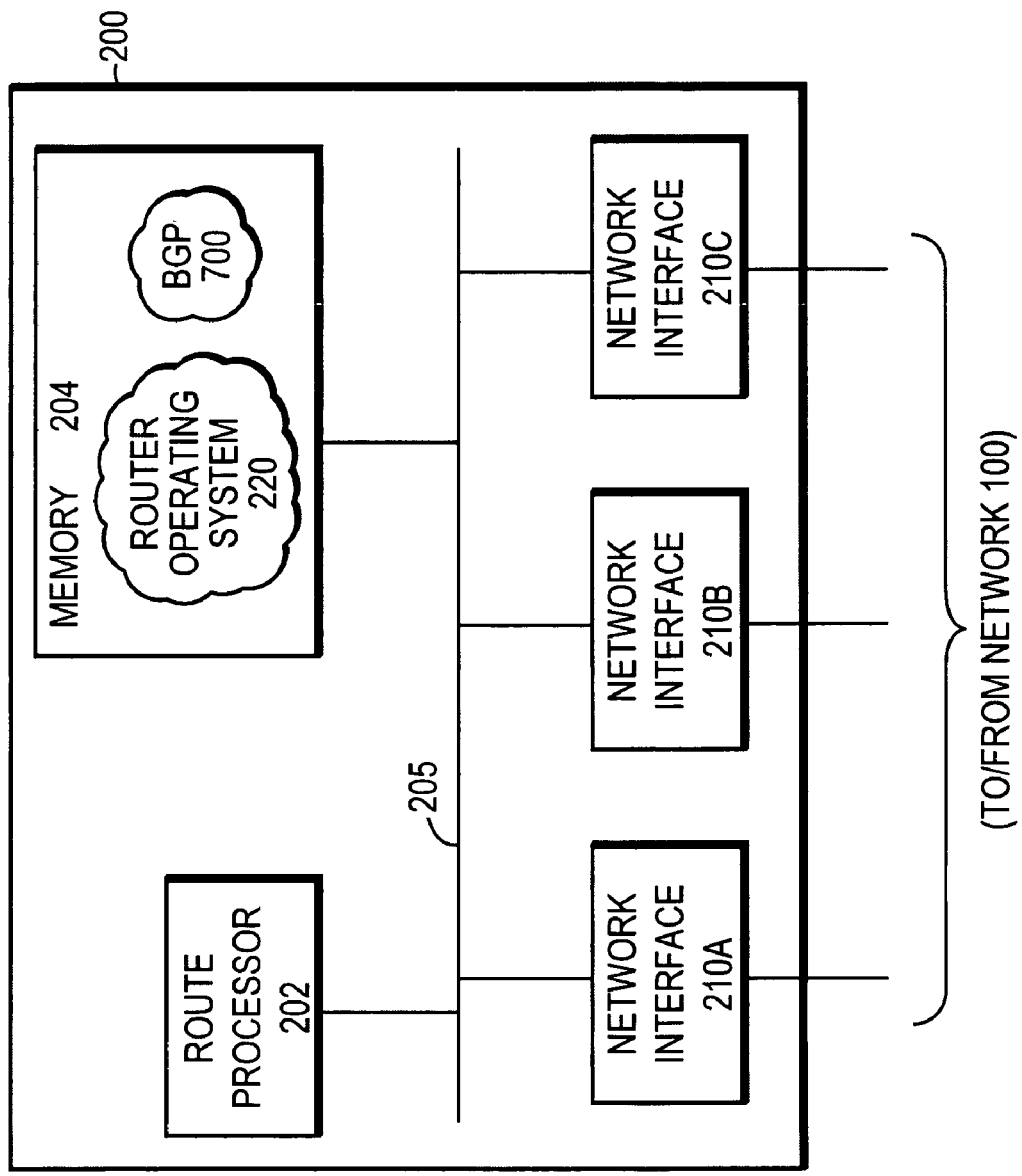
FIG. 2 is a schematic block diagram of an embodiment of an interdomain router that may be advantageously used with the present invention.

FIG. 2 is a schematic block diagram of an interdomain router 200 that may be advantageously used with the present invention. The interdomain router 200 comprises a route processor 202 coupled to a memory 204 and a plurality of network interface adapters 210A-C via a bus 205. The memory 204 may comprise storage locations addressable by the processor and interface adapters for storing software programs and data structures that may be advantageously used with the inventive technique described herein. The route processor 202 may comprise processing elements or logic for executing the software programs and manipulating the data structures. An operating system 220, portions of which is typically resident in memory 204 and executed by the route processor, functionally organizes the router by, inter alia, invoking network operations in support of software processes and routing protocol modules executing on the router. As described herein, one such routing protocol is the Border Gateway Protocol version 4+ (BGP 700).

It will be apparent to those skilled in the art that other processor and memory means, including various computer readable media, may be used for storing and executing program instructions pertaining to the inventive technique described herein.

Figure 3:
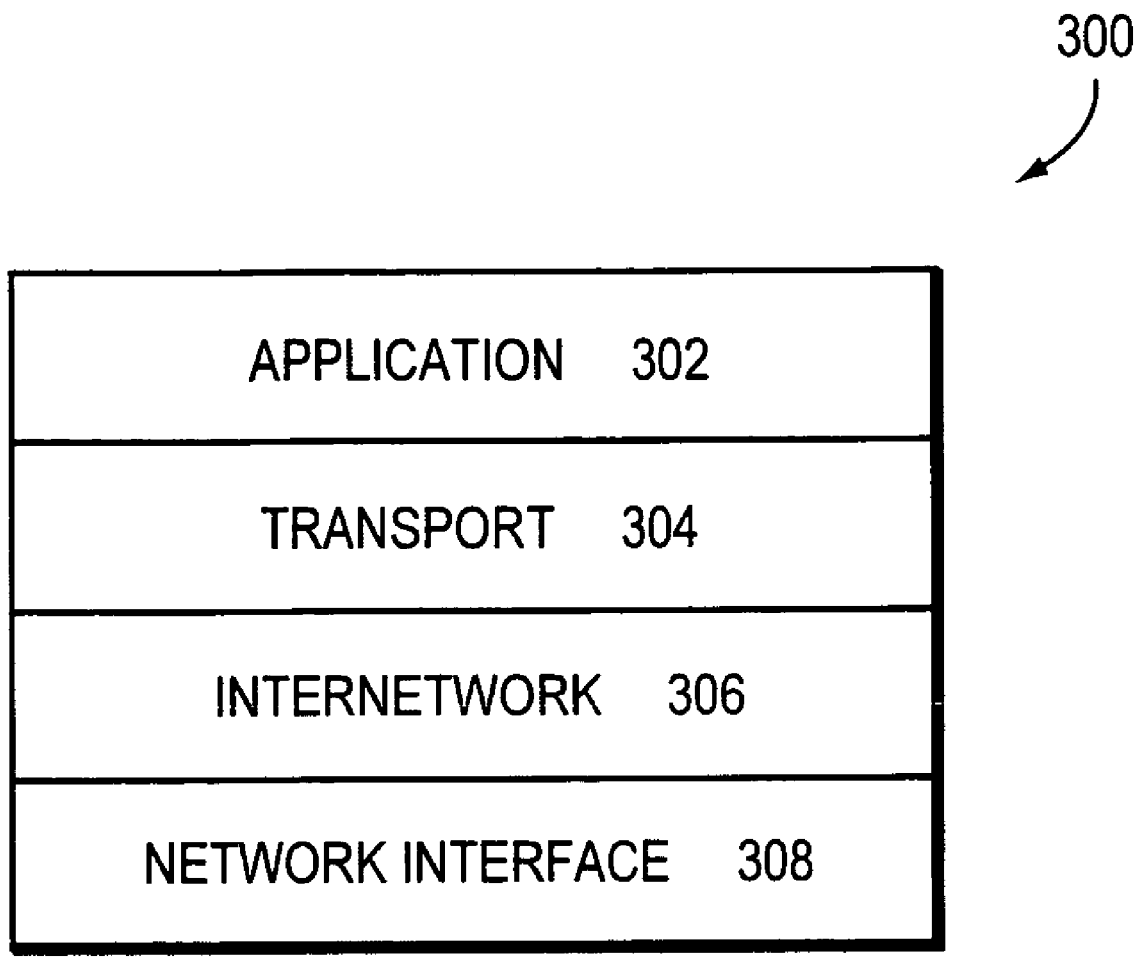
FIG. 3 is a schematic block diagram of a conventional protocol stack, such as the Internet communications protocol stack, within the interdomain router of FIG. 3.

A key function of the interdomain router 200 is determining the next router to which a packet is sent; in order to accomplish such "routing" the interdomain routers cooperate to determine best paths through the computer network 100. The routing function is preferably performed by an internetwork layer of a conventional protocol stack within each router. FIG. 3 is a schematic block diagram of a conventional network protocol stack, such as the Internet communications protocol stack 300. The architecture of the Internet protocol stack is represented by 4 layers termed, in ascending interfacing order, the network interface layer 308, the internetwork layer 306, the transport layer 304 and the application layer 302.

The lower network interface layer 308 is generally standardized and implemented in hardware and firmware, whereas the higher layers may be implemented in the form of software. The primary internetwork layer protocol of the Internet architecture is the IP protocol. IP is primarily a connectionless protocol that provides for internetwork routing, fragmentation and reassembly of exchanged packets—generally referred to as "datagrams" in an Internet environment—and which relies on transport protocols for end-to-end reliability and other service characteristics. An example of such a transport protocol is the TCP protocol, which is implemented by the transport layer 304 and provides connection-oriented, end-to-end reliability services to the upper layer protocols of the Internet architecture. The term TCP/IP is commonly used to denote the Internet architecture.

In particular, the internetwork layer 306 is concerned with how packets are forwarded through the network, although it is not directly concerned with how forwarding information bases (FIBS) are constructed. An interdomain routing protocol, such as BGP, is used to perform interdomain routing (for the internetwork layer) through the computer network. The interdomain routers 200 (hereinafter "peers") exchange routing and reachability information among the autonomous systems over a reliable transport layer connection, such as TCP. An adjacency is a relationship formed between selected peer routers for the purpose of exchanging routing messages and abstracting the network topology. The BGP protocol "runs" on top of the TCP transport layer 304 to ensure reliable communication of routing messages among the peer routers.

In order to perform routing operations in accordance with the BGP protocol, each interdomain router 200 maintains a routing table that lists all feasible paths from that router to each network. The routers exchange the routing information using Update messages when their routing tables change. The Update messages are generated by an updating router to advertise best paths to each of its neighboring peer routers (peers) throughout the computer network. These routing updates allow the BGP routers of the autonomous systems to construct a consistent and up-to-date view of the network topology.

Figure 4:
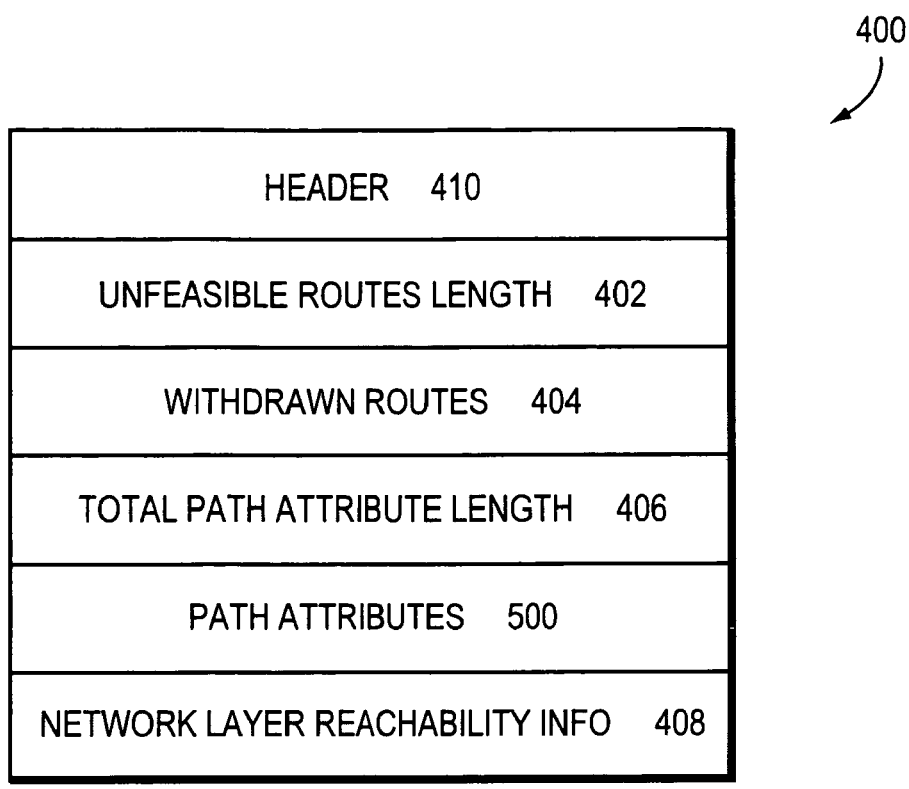
FIG. 4 is a schematic block diagram of a BGP Update message that may be advantageously used with the present invention.

FIG. 4 is a schematic block diagram of a conventional BGP Update message 400 comprising a plurality of fields appended to a header 410. A withdrawn (unfeasible) routes length field 402 indicates the total length of a withdrawn routes field 404, which illustratively contains a list of network layer (e.g., IP) address prefixes for the routes being withdrawn from service. A total path attribute length field 406 indicates the total length of a path attributes field 500 and a network layer reachability information (NLRI) field 408 illustratively contains a list of IP (IPv4) address prefixes. Note that the combination of a set of path attributes and a prefix is referred to as a "route"; the terms "route" and "path" may be used interchangeably herein. The format and function of the Update message 400 is described in *RFC* 1771 and *Interconnections, Bridges and Routers*.

Figure 5:
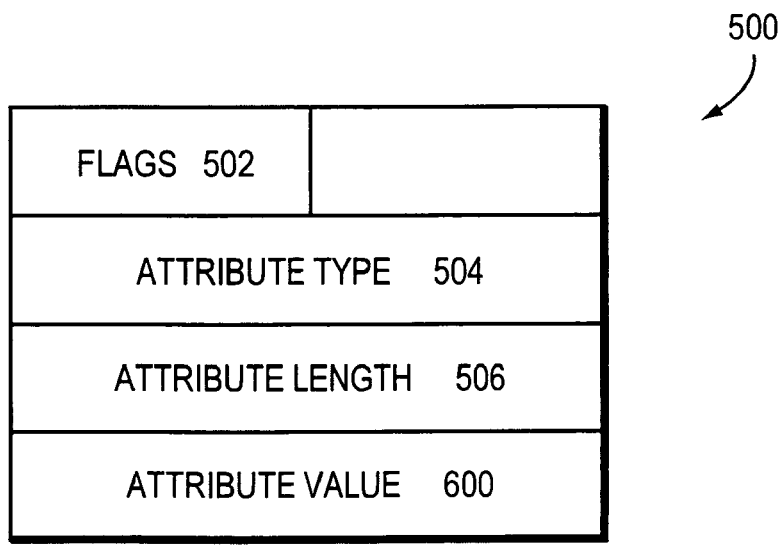
FIG. 5 is a schematic block diagram of a path attributes field of the BGP Update message that may be advantageously used with the present invention.

Specifically, the path attributes field 500 comprises a sequence of fields, each describing a path attribute in the form of a triple (i.e., attribute type, attribute length, attribute value). FIG. 5 is a schematic block diagram of the path attributes field 500 comprising a plurality of subfields including a flags subfield 502, an attribute type subfield 504, an attribute length subfield 506 and an attribute value subfield 600. In particular, the attribute type subfield 504 specifies a plurality of attribute type codes, examples of which illustratively include two path attributes defined by the BGP4+ protocol, Multiprotocol Reachable NLRI (MP REACH NLRI) type code 14 and Multiprotocol Unreachable NLRI (MP UNREACH NLRI) type code 15. The MP REACH NLRI attribute is used to carry a set of reachable destinations together with next hop information to be used for forwarding to these destinations. The MP UNREACH NLRI attribute is used to carry a set of unreachable destinations. Note that the path attributes are derived from a combination of configuration and protocol (i.e., propagated from the BGP protocol) information.

FIG. 6 is a schematic block diagram illustrating formats of MP REACH NLRI and MP UNREACH NLRI path attributes 610 and 650 contained in the attribute value subfield 600. The MP REACH NLRI path attribute 610 comprises a plurality of fields including, inter alia, an address family identifier (AFI) field 612, a subsequent address family identifier (SAFI) field 614, a length of next hop network address field 616 and a network address of next hop field 618. The AFI field 612 carries the identity of the network layer protocol associated with the network address contained in field 618. The SAFI field 614 provides additional information about the type of NLRI carried in the attribute. The length of next hop network address field 616 contains a value expressing the length of the network address of next hop contained in field 618.

The MP UNREACH NLRI path attribute 650 comprises a plurality of fields including an address family identifier (AFI) field 652, a subsequent address family identifier (SAFI) field 654 and a withdrawn routes field 656. The AFI field 652 carries the identity of the network layer protocol associated with the NLRI contained in field 656 and the SAFI field 654 provides additional information about the type of NLRI carried in the attribute. The withdrawn routes field 656 lists NLRI for routes that are being withdrawn from service.

Figure 7:
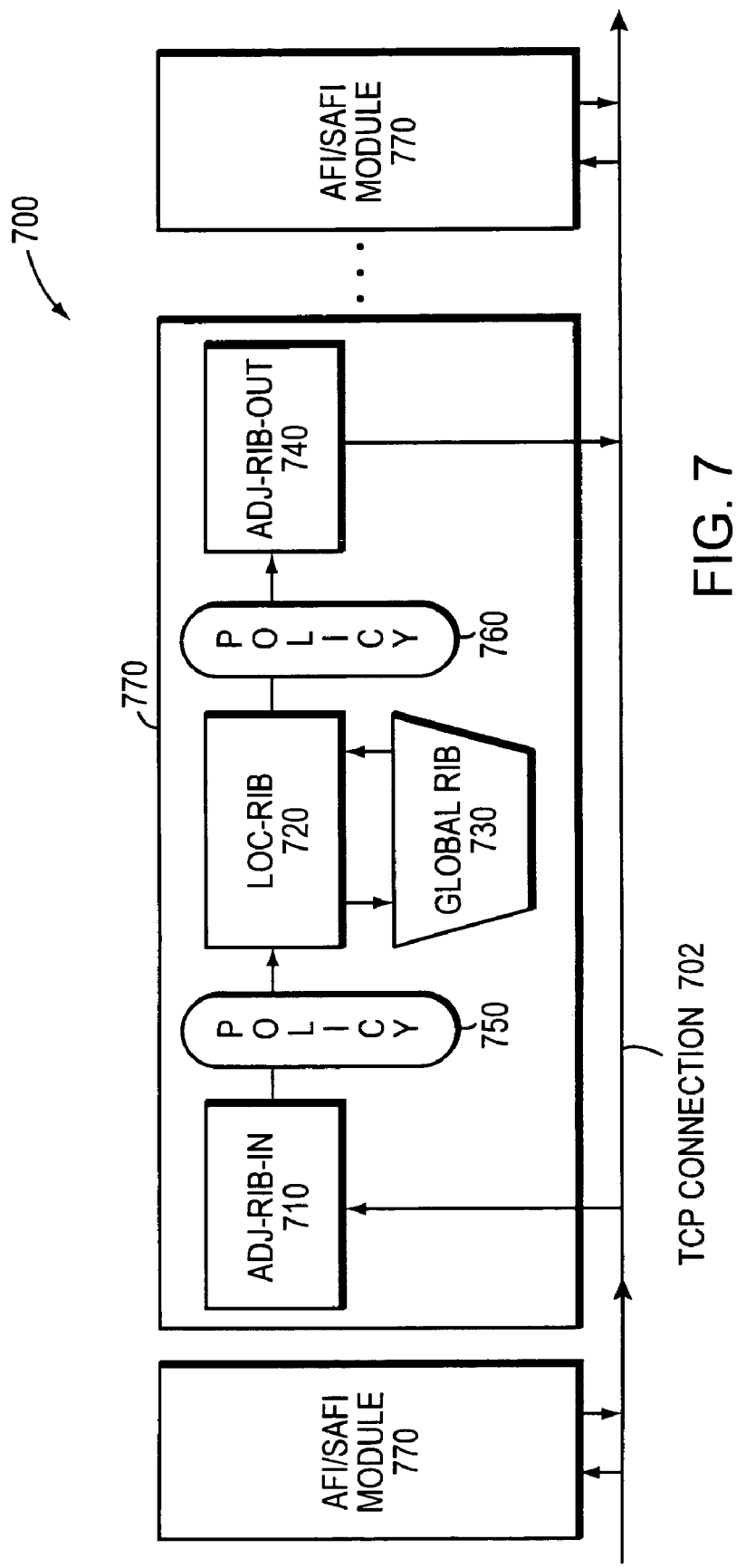
FIG. 7 is a schematic block diagram depicting an illustrative architecture of the BGP protocol.

FIG. 7 is a schematic block diagram depicting an illustrative architecture of the BGP protocol 700 executing on router 200. As noted, the BGP protocol enables the exchange of routing information among BGP peers using Update messages 400 that include path attributes that identify a network layer protocol and a type of NLRI. The BGP protocol 700 is illustratively organized as a plurality of address family application (AFI/SAFI) modules 770, each of which is configured to provide a service such as IPv4/unicast, IPv4/multicast, IPv6/unicast or IPv6/multicast. Note that the inventive technique described herein may apply to other address family application modules configured to provide other services. Each AFI/SAFI service is enabled on a per peer basis by exchanging capabilities over the reliable BGP session between the router and its peer. Two or more services may be enabled for two or more AFI/SAFI modules 770 over the same BGP session and reliable transport.

Specifically, the peer routers announce routing updates via a TCP connection 702. Each TCP connection establishes the reliable transport for the BGP session over which Update messages 400 are exchanged between the peers. The BGP protocol "listens" for these Update messages 400 and stores all learned routes for each connection in a BGP database. The BGP database is illustratively organized as Adjacency RIB In (Adj-RIB-In 710), Adjacency RIB Out (Adj-RIB-Out 740) and local RIB (loc-RIB 720). Each peer/TCP connection 702 is associated with an Adj-RIB-In 710 and an Adj-RIB-Out 740. The BGP protocol runs inbound policy on all routes "learned" for each connection 702 and those routes that match are stored in an Adj-RIB-In 710 unique to that connection. Additional inbound policy 750 (filtering) is then applied to those stored routes, with a potentially modified route being installed in the loc-RIB 720.

The loc-RIB stores routes that are similar to the routes in the forwarding table; to that end, the loc-RIB 720 is generally responsible for selecting the best route per prefix from the union of all policy-modified Adj-RIB-In routes, resulting in routes referred to as "best paths". The set of best paths is then installed in the global RIB 730, where those paths may contend with best paths from other protocols to become the "optimal" path ultimately selected for forwarding. The global RIB 730 illustratively maintains the routing table for the router. Note that the routing table typically denotes a database containing all available routes, including ones that have been selected for forwarding (optimal paths) as well as, in some cases, backup routes that are not currently selected for forwarding. In contrast, the forwarding table denotes those optimal best paths that have actually been selected for forwarding. Thereafter, the set of best paths has outbound policy 760 run on it, the result of which is placed in the appropriate Adj-RIB-Out 740 and announced to the respective peers via the same TCP connection 702 from which Update messages were learned.

Often, an event may arise wherein a network administrator resets the BGP session for administrative reasons, e.g., to upgrade or enable a service of an AFI/SAFI module 770, or an error condition occurs with the module. The peers typically communicate the occurrence of the event or error condition through a conventional BGP Notification Message. However, a problem with the conventional Notification message is that it resets the BGP session (including reset of all the AFI/SAFI module services) and terminates the reliable transport connection 702 between the routers. Thus, an event or error associated with one AFI/SAFI service provided over the transport penalizes all other services provided over that transport.

The present invention is directed to a soft notification technique that isolates address family application (AFI/SAFI) based errors or events occurring within a routing protocol, such as the Border Gateway Protocol (BGP), used to exchange routing information between a router and its peer router over a BGP session operating on a reliable transport. The technique apportions the session into a plurality of logical subsets, each of which is associated with an address family application (AFI/SAFI) module 770 of the BGP protocol 700. Novel BGP soft notification messaging is employed to allow the router to notify its peer of an isolated error condition or event associated with an AFI/SAFI module. Isolation of the error/event in a notification message instructs the peer to restart ("soft reset") only the associated AFI/SAFI module, thereby obviating the need to reset or terminate the entire BGP session and reliable transport (connection 702) between the router and peer. Notably, soft reset of the module occurs without disrupting services provided by other AFI/SAFI modules of the BGP protocol.

According to the soft notification technique, a new BGP message type, the BGP Soft Notification message, is defined that allows a network administrator to soft reset an AFI/SAFI module 770 without terminating the BGP session and without impacting services provided by other AFI/SAFI modules. The BGP Soft Notification message is described in *Internet Draft,* http://www.ietf.org/internet-drafts/draft-nalawade-bgp-soft-notify-00.txt titled, BGPv4 *Soft-Notification Message* by G. Nalawade et al (February 2004), which is hereby incorporated by reference.

Figure 8:
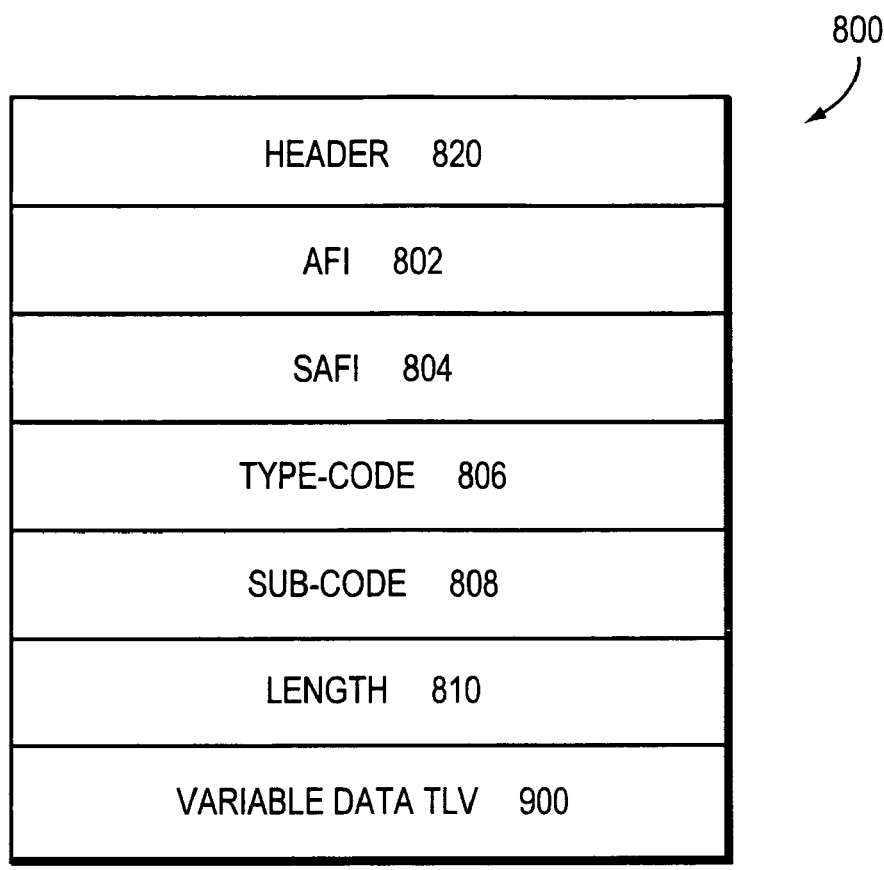
FIG. 8 is a schematic block diagram of a Soft Notification message in accordance with the present invention.

FIG. 8 is a schematic block diagram of a Soft Notification message 800 in accordance with the present invention. In the illustrative embodiment, the Soft Notification message is a BGP message having a predetermined type. As a BGP message, the Soft Notification message 800 includes a fixed-size BGP header 820. In addition, the Soft Notification message includes an AFI field 802, a SAFI field 804, a type-code field 806, a sub-code field 808, a length field 810 and a variable data TLV field 900. Illustratively, the AFI/SAFI fields contain values that indicate the AFI/SAFI module 770 for which the error condition or event has occurred and needs to be soft reset. A first reserved value indicates that the Soft Notification message 800 applies to all AFI/SAFI services, whereas a second reserved value contained in only the SAFI field 804 indicates that the message applies to all SAFI services under a particular AFI service. Note that the values contained in AFI field 802 and SAFI field 804 are defined in http://www.iana.org/assignments/address family-numbers and http://www.iana.org/assignments/safi-namespace.

The type-code field 806 contains a value that indicates an error condition or event for a respective AFI/SAFI module 770. In the illustrative embodiment, the following type-codes, which are generally described in *RFC* 1771 and *A Border Gateway Protocol* 4 (*BGP*-4), are defined:

| Error Code | Symbolic Name |
|---|---|
| 1 | Update Message Error |
| 2 | Cease |
| 3 | Event |

The sub-code field 808 contains a value that defines a subcode related to the error condition or event conveyed by the message. In the illustrative embodiment, the following sub-codes, which are generally described in *RFC* 1771 and *A Border Gateway Protocol* 4 (*BGP*-4), are defined:

Update Message Error Subcodes

1—Malformed Attribute List.
2—Unrecognized Well-known Attribute
3—Missing Well-known Attribute
4—Attribute Flags Error
5—Invalid Attribute Length
6—Invalid ORIGIN Attribute
7—Invalid NEXT HOP Attribute
8—Optional Attribute Error
9—Invalid Network Field
10—Bad ASPATH
11—Invalid Message Type.

Cease Message Error Subcodes

Figure 9:
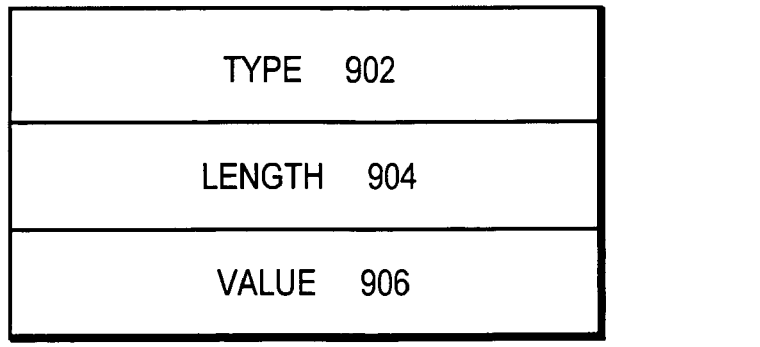
FIG. 9 is a schematic block diagram of a Variable Data TLV in accordance with the present invention.

1—Maximum Number of Prefixes Reached
2—Administratively Shutdown
3—Peer Unconfigured
4—Administratively Reset
5—Other Configuration Change Event Message Subcodes 1—ACK Soft Notification
2—Peer Administratively Unshut
3—Peer Configured
4—Timer Expired
5—Dampening Routes
6—Undampened Routes The length field 810 contains the length of the remaining message and the Variable Data TLV field 900 is an optional, variable length field that contains a Variable Data TLV. TLV encoding is a generic way to communicate information between two nodes, such as routers, where the information may not be entirely known to one router. Accordingly, the Variable Data TLV field 900 may be used to carry additional information about the error condition or event. FIG. 9 is a schematic block diagram of the Variable Data TLV 900 in accordance with the present invention. The Variable Data TLV includes a type field 902 used to identify a type (T) of information being conveyed, a length field 904 used to identify the length (L) of information to be conveyed and a value field 906 containing a value (V) of the actual information conveyed.

An advantage of TLV-based communication is that a router can skip over any type of information that it is not configured to "understand". That is, using the length (L) parameter, the router can skip an attribute (TLV) it doesn't understand, until it finds a TLV for which it is configured. The length (L) parameter is implementation-specific and can denote the length from the beginning of the first field of the attribute to the end. However, the length generally denotes the length of the value (V) field and not the type field or length field. Note that no TLV may appear in a Soft Notification message more than once. In the illustrative embodiment, the following TLVs are defined:

| Type | Name | Length | Value |
|---|---|---|---|
| 1 | string | variable | a text string whose length is specified by the length field. Not null terminated. |
| 2 | PDU | variable | a copy of the PDU that triggered the Soft Notification message. May be truncated. |
| 3 | attribute | variable | a copy of the path attribute that triggered the Soft Notification message. May be truncated. |
| 4 | integer | 4 octets | a four-octet integer |

A BGP router may generate a Soft Notification message 800 for relevant AFI/SAFI modules 770 in lieu of a conventional Notification Message using relevant type-codes and sub-codes, as redefined herein. The BGP router may also generate a Soft Notification message in case of an Event. According to the invention, BGP soft notification messaging separates BGP functionality on a per BGP peer, AFI/SAFI basis. The, soft notification technique assists in isolating the reliable transport, e.g., TCP, from actual protocol services/features which, in turn, prevents BGP peers from resetting the TCP transport 702 for any protocol errors related to its specific AFI/SAFI module 770. Preventing transport disruptions further assists in isolating network outages to specific AFI/SAFI errors.

The following flowcharts apply to the processing of the novel BGP Soft Notification message 800 with the various error type codes described above. When receiving a BGP Soft Notification Message sent from a router, a peer takes an action based on the type code contained in the message. The router also takes an action after it has sent the Soft Notification message to its peer. It should be noted that the actions taken by the router and its peer do not necessarily have to occur (and, if fact, may not occur) in the sequence shown and described. Therefore, the following flowcharts are only illustrative of one set of examples and not prescriptive. It should be further noted that a Soft Notification message having a type-code "Event" and a sub-code "ACK Soft-Notification" is referred to herein as a "Soft-Notify-ACK".

Figure 10:
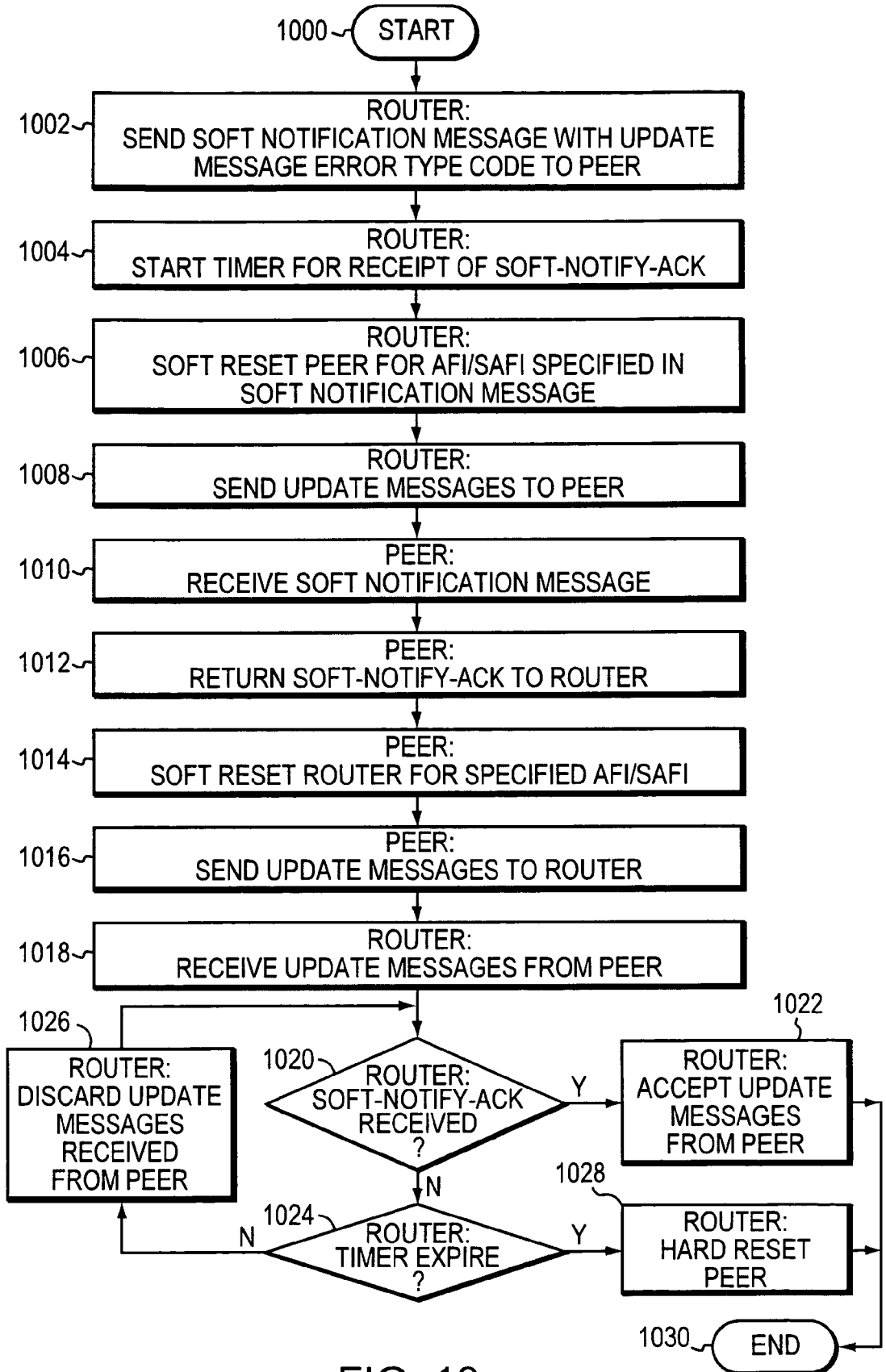
FIG. 10 is a flowchart illustrating a procedure involving a Soft Notification message with Update Message Error type code in accordance with the present invention.

FIG. 10 is a flowchart illustrating a procedure involving a Soft Notification message with Update Message Error type code issued from a router to its peer. The procedure starts at Step 1000 and proceeds to Step 1002 where the router sends a Soft Notification message with Update Message Error type code to the peer. In Step 1004, the router starts a timer for a receipt of a Soft-Notify-ACK from the peer. Thereafter, in Step 1006, the router "soft resets" the peer for the AFI/SAFI specified in the Soft Notification message by, e.g., discarding any Update messages from the peer until the Soft-Notify ACK is received and flushing the routes (in, e.g., Adj-RIB-In 710) for the peer for the AFI/SAFI specified in the Soft Notification message. In Step 1008, the router begins sending new Update messages to the peer.

Upon receiving the Soft Notification message containing the Update Message Error type code (Step 1010), the peer returns the Soft-Notify-ACK to the sending router in Step 1012. In Step 1014, the peer soft resets the router for that AFI/SAFI by, e.g., flushing the routes of the router for the AFI/SAFI. In Step 1016, the peer then proceeds to re-advertise its own routes by sending Update messages to the router. In Step 1018, the router receives the Update messages from the peer and, in Step 1020, determines whether the Soft-Notify-ACK has been received. If so, the router resumes accepting Update messages from the peer in Step 1022 and the procedure ends at Step 1030. Otherwise, the router determines whether the Soft Notification timer has expired (Step 1024). If not, the router discards any Update messages from the peer in Step 1026 and the procedure returns to Step 1020. However, if the Soft Notification timer expires before receipt of the Soft-Notify-ACK, the router "hard resets" the peer (Step 1028) by terminating the BGP session and the sequence ends at Step 1030.

Figure 11:
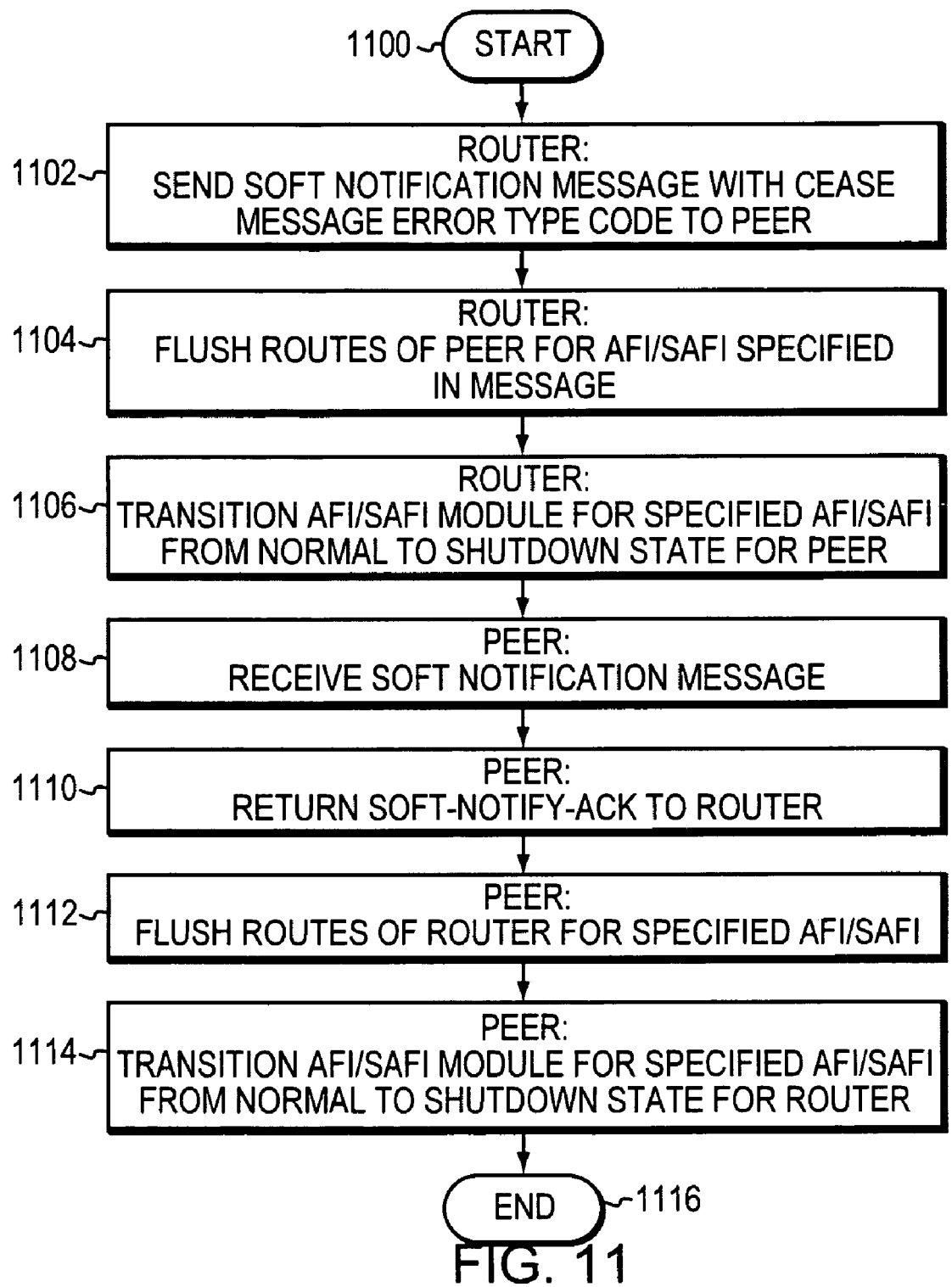
FIG. 11 is a flowchart illustrating a procedure involving a Soft Notification message with Cease Message Error type code in accordance with the present invention.

FIG. 11 is a flowchart illustrating a procedure involving a Soft Notification message with Cease Message Error type code issued from a router to its peer. The procedure starts at Step 1100 and proceeds to Step 1102 where the router sends a Soft Notification message with Cease Message Error type code to the peer. In Step 1104, the router flushes the routes of the peer for the AFI/SAFI specified in the message and, in Step 1106, transitions its AFI/SAFI module for the specified AFI/SAFI from a normal state to a shutdown state for that peer. In the illustrative embodiment described herein, a shutdown state of an AFI/SAFI for a peer is a state in which a router will not accept and process any Update messages from the peer. In Step 1108, the peer receives the Soft Notification message with the Cease Message Error type code and, in Step 1110, returns a Soft Notify-ACK to the router. In Step 1112, the peer flushes the routes of the router for the specified AFI/SAFI and, in Step 1114, transitions its AFI/SAFI module for the specified AFI/SAFI from a normal state to a shutdown state for the router. The procedure then ends at Step 1116.

Figure 12:
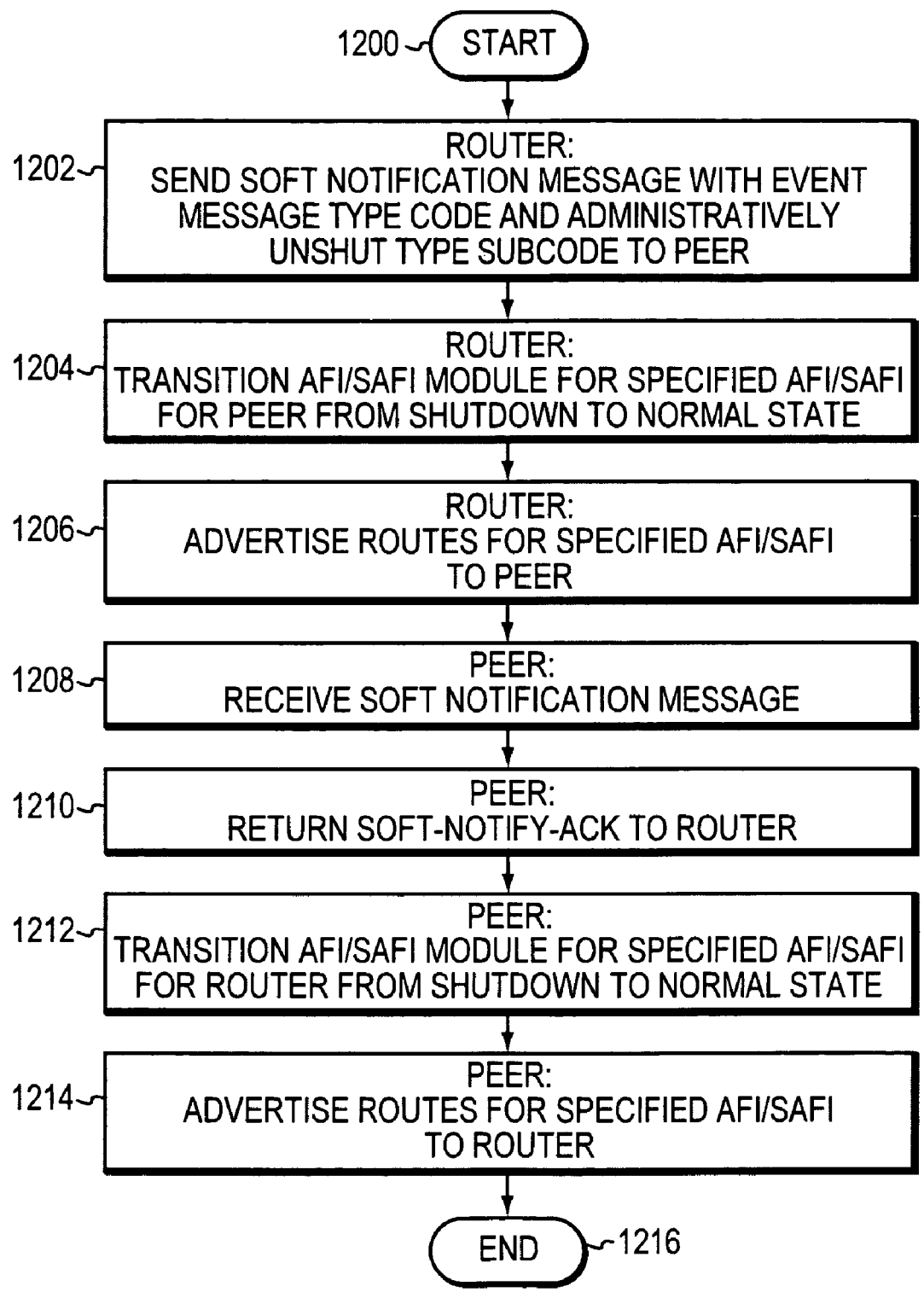
FIG. 12 is a flowchart illustrating a procedure involving a Soft Notification message with Event Message Error type code in accordance with the present invention.

FIG. 12 is a flowchart illustrating a procedure involving a Soft Notification message with Event Message type code issued from a router to its peer. The procedure starts at Step 1200 and proceeds to Step 1202 where the router sends a Soft Notification message with Event Message type code and Administratively Unshut type subcode to the peer. In Step 1204, the router transitions the AFI/SAFI module for the specified AFI/SAFI for the peer from the shutdown state to the normal state (in response to receiving the Soft-Notify-ACK that is returned in Step 1210). In Step 1206, the router then advertises its routes for that AFI/SAFI to the peer. In Step 1208, the peer receives the Soft Notification message with Event Message type code and Administratively Unshut type subcode.

In Step 1210, the peer returns a Soft-Notify-ACK to the router and, in Step 1212, transitions its AFI/SAFI module for the specified AFI/SAFI from the shutdown state to the normal state. Note that if the Soft Notification message contains any Event Message type subcode other than Administratively Unshut and Soft-Notify-ACK, the peer returns a Soft-Notify-ACK to the router and may choose to log the message. In Step 1214, the peer then advertises its routes for the relevant AFI/SAFI to the router and the sequence ends at Step 1216.

Advantageously, the inventive technique uses a single BGP session to exchange routing information related to different AFI/SAFI modules to enable sharing of resources among the modules of the BGP protocol executing on the routers. Moreover, the soft notification technique logically separates the reliable transport from the AFI/SAFI modules to thereby allow scaling of BGP features and services over a single BGP session. Such logical separation allows a router to gracefully recover from an error condition and/or warn its peer about the occurrence of a BGP-related event pertaining to an AFI/SAFI module.

While there has been shown and described embodiments of a soft notification technique that isolates AFI/SAFI based errors occurring within a routing protocol, such as BGP, it is to be understood that various other adaptations and modifications may be made within the spirit and scope of the present invention. For example, the technique contemplates a situation where a router sends multiple Soft Notification messages to a peer. Here, sending of Soft Notification messages and soft resetting of the peer for a particular AFI/SAFI module should be rate-limited, with a mechanism being provided for exponential "back-off".

Specifically, in response to sending multiple Soft Notification messages, the router tracks those messages that are not yet acknowledged. Upon receiving a Soft-Notify-ACK from the peer, the router associates that acknowledgement with the earliest Soft Notification message pending a Soft-Notify-ACK.

The foregoing description has been directed to specific embodiments. It will be apparent, however, that other variations and modifications may be made to the described embodiments, with the attainment of some or all of their advantages. For instance, the various processes described herein can be implemented as software, including a computer-readable medium having program instructions executing on a computer, hardware, firmware, or a combination thereof. In addition, the data structures described herein can include additional information.

The techniques herein may also apply generally to a new capability code that is defined for the BGP Soft Notification message. Here, a BGP Soft Notification message can only be sent by a router to peers that have advertised this capability. Furthermore, the technique may apply to other routing protocols such as, e.g., distance vector routing protocols, that support multiple AFI/SAFIs.

3.0 Network Routing Apparatus with Soft Graceful Restart 3.1 Overview

An approach for graceful restart of BGP routers is described in an IETF internet-draft document of S. Sangli et al., "Graceful Restart Mechanism for BGP," draft-ietf-idr-restart-10.txt. The mechanism described in the BGP Graceful Restart draft preserves routing state for each AFI or SAFI whenever a BGP session is terminated due to a peering router's restart. Prior U.S. patent application Ser. No. 10/833,811, filed Apr. 28, 2004, of G. Nalawade et al., "Soft Notification Messaging for a Routing Protocol" ("Nalawade et al." herein) describes an invention that allows BGP to perform soft resets on a per peer per AFI/SAFI basis, while allowing the BGP sessions and BGP state to be maintained. The invention of Nalawade et al. avoids resetting the BGP session between peers, and avoids deleting the routing state for other functional AFI/SAFIs that share the same peer session. However, Nalawade et al. does not preserve the routing and forwarding information for the AFI/SAFI that is being reset.

FIG. 14 is a high-level flow diagram of an approach for performing soft graceful restart. In the approach of FIG. 14 and FIG. 15A, 15B as described below, the BGP graceful restart mechanism is performed for a soft-reset of an AFI or SAFI. Referring first to FIG. 14, in step 1402, a BGP peering session is established between a first node and a second node in a packet-switched network. Typically the first node and second node are routers that implement BGP and thus are BGP peers. In step 1403, the first node and second node perform a capability negotiation in which the peer BGP speakers announce that each has the capability to perform graceful restart as in Sangli et al., and also have a BGP soft graceful restart capability, newly defined herein, for a given AFI/SAFI.

In step 1404, one node detects a BGP condition requiring a soft reset of an AFI or SAFI data structure that need not affect BGP state or forwarding state. For example, such a condition could be expiration of a timer, exceeding the max-prefix-limit, etc. Such a condition also could comprise receiving a BGP Notification message indicating an error, such as a malformed update message. Step 1404 includes performing a soft reset of the particular AFI or SAFI; in an embodiment, a soft notification message referencing only the particular AFI or SAFI is sent to peers. Thus, peers are instructed to soft reset only the particular AFI or SAFI and not to modify route data in a RIB or FIB for any other AFI or SAFI. In response, at step 1406, when the particular AFI/SAFI is soft-reset, the BGP peer preserves the BGP state by not deleting routes for the AFI/SAF from the BGP-RIB, and the forwarding state for that AFI/SAFI is preserved at step 1408 by not deleting routes for the AFI/SAFI from the Adj-RIB-Out or FIB. Therefore, forwarding can continue for that AFI/SAFI until the new routes for the soft-reset AFI/SAFI are learned from the resetting peer, as shown in step 1410.

The following section details more specific steps that a resetting speaker and receiving speaker may perform in an implementation. The functions described herein with respect to FIG. 14 and FIG. 15A, 15B may be implemented in one or more computer programs, software modules, or other software, firmware or hardware elements in a network packet routing device. Computer programs or software modules implementing such functions may be integrated into an operating system of a router or other network element, or may be implemented in an independent module, such as a BGP module.

3.2 Procedures for a Resetting Speaker and a Receiving Speaker

FIG. 15A and FIG. 15B are flow diagrams of steps performed in peer BGP network routing devices in an approach for performing soft graceful restart for an AFI/SAFI. In the following description, "Resetting Speaker" refers to a router that has generated the soft-notification message and has soft-reset an AFI/SAFI with its peer, and "Receiving Speaker" refers to a router that peers with the resetting speaker.

In step 1502, the resetting speaker and restarting speaker negotiate a new BGP capability termed the Soft-Graceful-Restart (Soft-GR) capability. Capability negotiation among BGP peers is generally described in IETF RFC 3392 of R. Chandra et al., "Capabilities Advertisement with BGP-4." The Soft-GR Capability is a capability that a BGP speaker can use to indicate its ability to preserve its forwarding state during the soft-reset of an AFI/SAFI between two BGP speakers. The Soft-GR Capability also can convey to a peer the intention of generating an End-Of-RIB marker upon completing initial routing updates after the soft-reset is performed. In one embodiment, the Soft-GR Capability has a distinct BGP capability code and a capability length of zero.

In an embodiment, the Soft-GR Capability mandates that the Graceful Restart Capability is also exchanged by the BGP speakers. If the BGP speakers successfully negotiate the Soft-GR Capability, then Soft-GR can be performed in the future for those AFI/SAFIs for which the BGP speakers also have successfully negotiated the Graceful Restart Capability.

The following description of FIG. 15A, 15B assumes the Graceful Restart Capability for the address family is advertised by the Resetting Speaker, and is understood by the Receiving Speaker, and a BGP session between them is established. The description also assumes that the two BGP Speakers have exchanged the Soft-GR Capability.

At step 1504, the resetting speaker detects a condition requiring reset of an AFI or SAFI data structure. At step 1506, the resetting speaker generates and sends a soft notification message, and also soft resets a particular AFI or SAFI.

In step 1508, the Resetting Speaker retains or preserves the BGP state of the AFI or SAFI. At step 1510 the resetting speaker marks those routes as stale and preserves the forwarding state for those BGP routes in the Loc-RIB. The Resetting Speaker marks the routes as stale because it is possible that during the period of a soft reset and recovery, a route withdrawal could have occurred for one of the routes associated with the affected AFI or SAFI. Alternatively, the error condition associated with the AFI or SAFI could have affected the routes for that AFI or SAFI. At step 1512, the resetting speaker continues to forward data on routes for the AFI or SAFI, and does not differentiate between stale and other information during forwarding.

For clarity, steps performed at the receiving speaker are described separately below. However, to clarify the action of the resetting speaker, after the soft notification message of step 1506 is sent, the receiving speaker soft resets the same AFI or SAFI as the resetting speaker and sends an acknowledgement (step 1554). In an embodiment, the acknowledgement of step 1554 is a BGPv4 Soft-Notification message containing a Soft-Notify-ACK. Once the Resetting Speaker and the Receiving Speaker have both soft-reset the AFI/SAFI and the Resetting Speaker has received an acknowledgment (step 1514), the Resetting Speaker receives and processes BGP messages from the Receiving Speaker for that AFI/SAFI, as shown at step 1516.

Referring now to FIG. 15B, at step 1518, the resetting speaker defers route selection for an AFI/SAFI, until the resetting speaker receives an End-of-RIB marker from the Receiving Speaker. In one embodiment, to impose a limit on the amount of time a router defers route selection, a configurable timer is started as part of step 1518. If the timer expires before an End-of-RIB marker has been received from all peers, the resetting speaker performs route selection at step 1520.

Alternatively, the End-of-RIB marker is sent by a BGP speaker to its peer once it completes the initial routing update for an AFI/SAFI after that AFI/SAFI has been soft-reset. For example, the receiving BGP speaker sends the End-of-RIB marker at step 1558. The initial routing updates may comprise corrective updates when an error has occurred with respect to an AFI/SAFI or may comprise changed or new routes that were advertised during the period of soft reset and recovery. The routing updates also may comprise renewed copies of routes for the AFI or SAFI that have been previously sent and have no changes. In response, at step 1520, the resetting BGP speaker performs route selection. The End-of-RIB marker is sent even when there are no updates to send, to signal that any updates have been sent and that the updating period is closed.

At step 1522, any previously marked stale information is removed from the Loc-RIB, and at step 1524 the FIB is updated based on the Loc-RIB. At step 1526, the Adj-RIB-Out is advertised to peers. Step 1558 indicates that the resetting BGP speaker also sends the End-of-RIB marker when it completes routing updates in response to peer requests.

Specific procedures for the Receiving Speaker are now described. Referring again to FIG. 15A, at step 1550, when the Receiving Speaker receives a BGPv4 SOFT-NOTIFACTION for an AFI/SAFI from the Resetting Speaker that has advertised the Graceful Restart and Soft-GR Capabilities, the Receiving Speaker retains the routes received from the peer for the AFI/SAFI that is reset, and marks such routes as stale routing information in the Loc-RIB. To address possible consecutive soft-resets, a route from the peer that was previously marked as stale is deleted, as shown at step 1552. The Receiving Speaker does not differentiate between stale and other routing information during forwarding.

The Receiving Speaker sends the End-of-RIB marker after the soft reset processing is performed, once it completes the initial update for an address family (including the case that it has no routes to send) to the peer, as shown by step 1559.

At step 1560, the Receiving Speaker receives and processes one or more routing updates from the Resetting Speaker. At step 1562, the Receiving Speaker replaces the stale routes by the routing updates received from the Resetting Speaker. Once an indication of a last routing update is received, such as when the End-of-RIB marker for an address family is received from the Resetting Speaker (step 1558), the Receiving Speaker immediately removes any routes from that peer that are still marked as stale, for that address family, as shown by step 1564. In one embodiment, step 1550 (FIG. 15A) also may involve initiating a timer that places an upper bound on the amount of time a router retains the stale routes. Thus, if the timer expires before the End-of-RIB marker has been received to trigger removal of routes, the Receiving Speaker removes routes at that time.

The approach herein can be extended to cover BGPv4 Notifications and normal BGP GR as further described below. The approach is applicable to notifications such as the Cease notification and the Holdtimer Expired notification, and can be extended to other notifications.

4.0 Implementation Mechanisms—Hardware Overview

Figure 13:
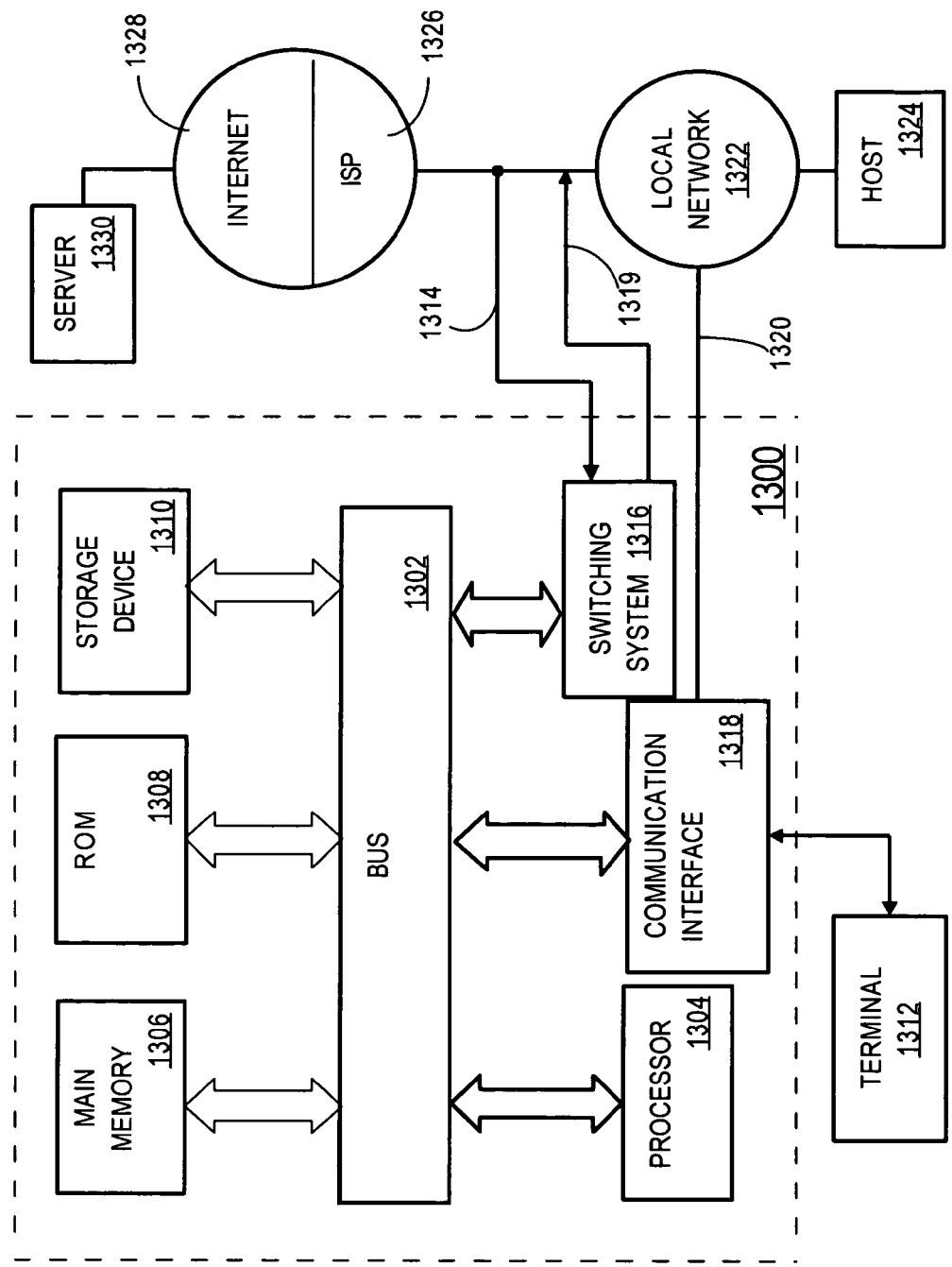
FIG. 13 is a block diagram that illustrates a computer system upon which an embodiment may be implemented.

FIG. 13 is a block diagram that illustrates a computer system 1300 upon which an embodiment of the invention may be implemented. The preferred embodiment is implemented using one or more computer programs running on a network element such as a router device. Thus, in this embodiment, the computer system 1300 is a router.

Computer system 1300 includes a bus 1302 or other communication mechanism for communicating information, and a processor 1304 coupled with bus 1302 for processing information. Computer system 1300 also includes a main memory 1306, such as a random access memory (RAM), flash memory, or other dynamic storage device, coupled to bus 1302 for storing information and instructions to be executed by processor 1304. Main memory 1306 also may be used for storing temporary variables or other intermediate information during execution of instructions to be executed by processor 1304. Computer system 1300 further includes a read only memory (ROM) 1308 or other static storage device coupled to bus 1302 for storing static information and instructions for processor 1304. A storage device 1310, such as a magnetic disk, flash memory or optical disk, is provided and coupled to bus 1302 for storing information and instructions.

A communication interface 1318 may be coupled to bus 1302 for communicating information and command selections to processor 1304. Interface 1318 is a conventional serial interface such as an RS-232 or RS-422 interface. An external terminal 1312 or other computer system connects to the computer system 1300 and provides commands to it using the interface 1314. Firmware or software running in the computer system 1300 provides a terminal interface or character-based command interface so that external commands can be given to the computer system.

A switching system 1316 is coupled to bus 1302 and has an input interface 1314 and an output interface 1319 to one or more external network elements. The external network elements may include a local network 1322 coupled to one or more hosts 1324, or a global network such as Internet 1328 having one or more servers 1330. The switching system 1316 switches information traffic arriving on input interface 1314 to output interface 1319 according to pre-determined protocols and conventions that are well known. For example, switching system 1316, in cooperation with processor 1304, can determine a destination of a packet of data arriving on input interface 1314 and send it to the correct destination using output interface 1319. The destinations may include host 1324, server 1330, other end stations, or other routing and switching devices in local network 1322 or Internet 1328.

The invention is related to the use of computer system 1300 for soft graceful restart of an AFI or SAFI under BGP. According to one embodiment of the invention, soft graceful restart of an AFI or SAFI under BGP is provided by computer system 1300 in response to processor 1304 executing one or more sequences of one or more instructions contained in main memory 1306. Such instructions may be read into main memory 1306 from another computer-readable medium, such as storage device 1310. Execution of the sequences of instructions contained in main memory 1306 causes processor 1304 to perform the process steps described herein. One or more processors in a multi-processing arrangement may also be employed to execute the sequences of instructions contained in main memory 1306. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1304 for execution. Such a medium may take many forms, including but not limited to, non-volatile media, volatile media, and transmission media. Non-volatile media includes, for example, optical or magnetic disks, such as storage device 1310. Volatile media includes dynamic memory, such as main memory 1306. Transmission media includes coaxial cables, copper wire and fiber optics, including the wires that comprise bus 1302. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1304 for execution. For example, the instructions may initially be carried on a magnetic disk of a remote computer. The remote computer can load the instructions into its dynamic memory and send the instructions over a telephone line using a modem. A modem local to computer system 1300 can receive the data on the telephone line and use an infrared transmitter to convert the data to an infrared signal. An infrared detector coupled to bus 1302 can receive the data carried in the infrared signal and place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

Communication interface 1318 also provides a two-way data communication coupling to a network link 1320 that is connected to a local network 1322. For example, communication interface 1318 may be an integrated services digital network (ISDN) card or a modem to provide a data communication connection to a corresponding type of telephone line. As another example, communication interface 1318 may be a local area network (LAN) card to provide a data communication connection to a compatible LAN. Wireless links may also be implemented. In any such implementation, communication interface 1318 sends and receives electrical, electromagnetic or optical signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider (ISP) 1326. ISP 1326 in turn provides data communication services through the worldwide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are exemplary forms of carrier waves transporting the information.

Computer system 1300 can send messages and receive data, including program code, through the network(s), network link 1320 and communication interface 1318. In the Internet example, a server 1330 might transmit a requested code for an application program through Internet 1328, ISP 1326, local network 1322 and communication interface 1318. In accordance with the invention, one such downloaded application provides for soft graceful restart of an AFI or SAFI under BGP as described herein.

The received code may be executed by processor 1304 as it is received, and/or stored in storage device 1310, or other non-volatile storage for later execution. In this manner, computer system 1300 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A network data packet routing apparatus, comprising one or more processors;
   one or more interfaces that are configured to couple to the processors and to one or more other devices in a packet-switched network;
   one or more non-transitory computer-readable media that are communicatively coupled to the one or more processors;
   one or more first sequences of instructions recorded on the computer-readable media which, when executed by the one or more processors, cause the one or more processors to interact with the other devices according to Border Gateway Protocol (BGP);
   one or more second sequences of instructions recorded on the computer-readable media which, when executed by the one or more processors, cause the one or more processors to perform:
   establishing a Border Gateway Protocol (BGP) peering session between a first node and a second node in the packet-switched network;
   detecting a BGP condition requiring a reset of a particular BGP address family indicator (AFI) data structure of a plurality of AFI data structures and not requiring a reset of all of the AFI data structures of the plurality of AFI data structures, wherein the BGP condition does not affect states of routes in the particular AFI;
   soft resetting the particular AFI and not modifying route data for any other AFI data structure of the plurality of AFI data structures;
   after soft resetting the particular AFI data structure:
   preserving a BGP state and a forwarding state of the particular AFI; and
   forwarding data on routes represented in the particular AFI.

2. The apparatus of claim 1, wherein the BGP condition is any one of notification of expiration of a timer received from a peer, and exceeding a maximum number of allowed prefixes.

3. The apparatus of claim 1, wherein the second sequences of instructions further comprise instructions that cause the one or more processors to perform negotiating a graceful restart capability with one or more of the other devices.

4. The apparatus of claim 3, wherein the second sequences of instructions further comprise instructions that cause the one or more processors to perform negotiating a soft graceful restart capability with one or more of the other devices.

5. The apparatus of claim 1, wherein the second sequences of instructions further comprise instructions that cause the one or more processors to perform sending a soft notification message and soft resetting the particular AFI in response to detecting the BGP condition.

6. The apparatus of claim 1, wherein the second sequences of instructions further comprise instructions that cause the one or more processors to perform, in response to detecting the BGP condition:
   sending a soft notification message;
   soft resetting the particular AFI;
   marking routes associated with the particular AFI as stale in a local routing information base (RIB);
   forwarding data to one or more of the other devices on routes associated with the particular AFI even if such routes are marked as stale;
   receiving from one or more of the other devices, and processing, one or more BGP UPDATE messages associated with the particular AFI;
   performing route selection;

removing from the local RIB one or more routes previously marked as stale;

updating a forwarding information base based on the local RIB; and advertising an external RIB to one or more of the other devices.

7. The apparatus of claim 6, wherein the second sequences of instructions further comprise instructions that cause the one or more processors to perform route selection only after receiving an End-of-RIB marker from one or more of the other devices.

8. The apparatus of claim 1, wherein the second sequences of instructions further comprise instructions that cause the one or more processors to perform:

receiving a soft notification message from a particular device among the other devices with which a BGP peering session has been established and that is resetting;

retaining and marking as stale one or more routes previously received from the particular resetting device and associated with the particular AFI;

forwarding data to one or more of the other devices on routes associated with the particular AFI even if such routes are marked as stale;

deleting from a routing information base one or more routes associated with the particular AFI that have been previously marked as stale;

sending one or more BGP update messages for the particular AFI to the particular resetting device;

receiving and processing one or more routing updates received from the particular resetting device;

replacing the stale marked routes with the one or more routing updates; and in response to receiving a last routing update, removing one or more routes for the particular AFI that are still marked as stale.

9. The apparatus of claim 8, wherein the second sequences of instructions further comprise instructions that cause the one or more processors to perform sending an acknowledgment of the soft notification message.

10. A network data packet routing apparatus, comprising one or more processors;

one or more interfaces that are configured to couple to the processors and to one or more other devices in a packet-switched network;

means for interacting with the other devices according to Border Gateway Protocol (BGP);

means for establishing a Border Gateway Protocol (BGP) peering session between a first node and a second node in the packet-switched network;

means for detecting a BGP condition requiring a reset of a particular BGP address family indicator (AFI) data structure of a plurality of AFI data structures and not requiring a reset of all of the AFI data structures of the plurality of AFI data structures, wherein the BGP condition does not affect states of routes in the particular AFI;

means for soft resetting the particular AFI and not modifying route data for any other AFI data structure of the plurality of AFI data structures;

means for preserving a BGP state and a forwarding state of the particular AFI after soft resetting the particular AFI data structure; and means for forwarding data on routes represented in the particular AFI after soft resetting the particular AFI data structure.

11. The apparatus of claim 10, wherein the BGP condition is any one of notification of expiration of a timer received from a peer, and exceeding a maximum number of allowed prefixes.

12. The apparatus of claim 10, further comprising means for negotiating a graceful restart capability with one or more of the other devices.

13. The apparatus of claim 12, further comprising means for negotiating a soft graceful restart capability with one or more of the other devices.

14. The apparatus of claim 10, further comprising means for sending a soft notification message and soft resetting the particular AFI in response to detecting the BGP condition.

15. The apparatus of claim 10, further comprising, responsive to detecting the BGP condition:

means for sending a soft notification message;

means for soft resetting the particular AFI;

means for marking routes associated with the particular AFI as stale in a local routing information base (RIB);

means for forwarding data to one or more of the other devices on routes associated with the particular AFI even if such routes are marked as stale;

means for receiving from one or more of the other devices, and processing, one or more BGP UPDATE messages associated with the particular AFI;

means for performing route selection;

means for removing from the local RIB one or more routes previously marked as stale;

means for updating a forwarding information base based on the local RIB; and means for advertising an external RIB to one or more of the other devices.

16. The apparatus of claim 15, further comprising means for performing route selection only after receiving an End-of-RIB marker from one or more of the other devices.

17. The apparatus of claim 10, further comprising:

means for receiving a soft notification message from a particular device among the other devices with which a BGP peering session has been established and that is resetting;

means for retaining and marking as stale one or more routes previously received from the particular resetting device and associated with the particular AFI;

means for forwarding data to one or more of the other devices on routes associated with the particular AFI even if such routes are marked as stale;

means for deleting from a routing information base one or more routes associated with the particular AFI that have been previously marked as stale;

means for sending one or more BGP update messages for the particular AFI to the particular resetting device;

means for receiving and processing one or more routing updates received from the particular resetting device;

means for replacing the stale marked routes with the one or more routing updates; and means for removing one or more routes for the particular AFI that are still marked as stale in response to receiving a last routing update.

18. The apparatus of claim 17, further comprising means for sending an acknowledgment of the soft notification message.

19. A non-transitory computer-readable medium carrying one or more sequences of instructions, which instructions, when executed by one or more processors, cause the one or more processors to carry out the steps of:

establishing a Border Gateway Protocol (BGP) peering session between a first node and a second node in a packet-switched network;

detecting a BGP condition requiring a reset of a particular BGP address family indicator (AFI) data structure of a plurality of AFI data structures and not requiring a reset of all of the AFI data structures of the plurality of AFI data structures, wherein the BGP condition does not affect states of routes in the particular AFI;

soft resetting the particular AFI and not modifying route data for any other AFI data structure of the plurality of AFI data structures;

after soft resetting the particular AFI data structure:
preserving a BGP state and a forwarding state of the particular AFI; and
forwarding data on routes represented in the particular AFI.

20. The computer-readable medium of claim 19, further comprising instructions that cause the one or more processors to perform, in response to detecting the BGP condition:
sending a soft notification message;
soft resetting the particular AFI;
marking routes associated with the particular AFI as stale in a local routing information base (RIB);
forwarding data to one or more of the other devices on routes associated with the particular AFI even if such routes are marked as stale;
receiving from one or more of the other devices, and processing, one or more BGP UPDATE messages associated with the particular AFI;
performing route selection;
removing from the local RIB one or more routes previously marked as stale;
updating a forwarding information base based on the local RIB; and
advertising an external RIB to one or more of the other devices.

21. The computer-readable medium of claim 19, further comprising instructions that cause the one or more processors to perform:
receiving a soft notification message from a particular device among the other devices with which a BGP peering session has been established and that is resetting;
retaining and marking as stale one or more routes previously received from the particular resetting device and associated with the particular AFI;
forwarding data to one or more of the other devices on routes associated with the particular AFI even if such routes are marked as stale;
deleting from a routing information base one or more routes associated with the particular AFI that have been previously marked as stale;
sending one or more BGP update messages for the particular AFI to the particular resetting device;
receiving and processing one or more routing updates received from the particular resetting device;
replacing the stale marked routes with the one or more routing updates; and
in response to receiving a last routing update, removing one or more routes for the particular AFI that are still marked as stale.

22. A method, comprising:
establishing a Border Gateway Protocol (BGP) peering session between a first node and a second node in a packet-switched network;
detecting a BGP condition requiring a reset of a particular BGP address family indicator (AFI) data structure of a plurality of AFI data structures and not requiring a reset of all of the AFI data structures of the plurality of AFI data structures, wherein the BGP condition does not affect states of routes in the particular AFI;

soft resetting the particular AFI and not modifying route data for any other AFI data structure of the plurality of AFI data structures;

after soft resetting the particular AFI data structure:
preserving a BGP state and a forwarding state of the particular AFI; and
forwarding data on routes represented in the particular AFI.

23. The method of claim 22, wherein the BGP condition is any one of notification of expiration of a timer received from a peer, and exceeding a maximum number of allowed prefixes.

24. The method of claim 22, further comprising negotiating a graceful restart capability with one or more of the other devices.

25. The method of claim 24, further comprising negotiating a soft graceful restart capability with one or more of the other devices.

26. The method of claim 22, further comprising sending a soft notification message and soft resetting the particular AFI in response to detecting the BGP condition.

27. The method of claim 22, further comprising:
in response to detecting the BGP condition:
sending a soft notification message;
soft resetting the particular AFI;
marking routes associated with the particular AFI as stale in a local routing information base (RIB);
forwarding data to one or more of the other devices on routes associated with the particular AFI even if such routes are marked as stale;
receiving from one or more of the other devices, and processing, one or more BGP UPDATE messages associated with the particular AFI;
performing route selection;
removing from the local RIB one or more routes previously marked as stale;
updating a forwarding information base based on the local RIB; and
advertising an external RIB to one or more of the other devices.

28. The method of claim 27, further comprising performing the route selection only after receiving an End-of-RIB marker from one or more of the other devices.

29. The method of claim 22, further comprising:
receiving a soft notification message from a particular device among the other devices with which a BGP peering session has been established and that is resetting;
retaining and marking as stale one or more routes previously received from the particular resetting device and associated with the particular AFI;
forwarding data to one or more of the other devices on routes associated with the particular AFI even if such routes are marked as stale;
deleting from a routing information base one or more routes associated with the particular AFI that have been previously marked as stale;
sending one or more BGP update messages for the particular AFI to the particular resetting device;
receiving and processing one or more routing updates received from the particular resetting device;

replacing the stale marked routes with the one or more routing updates; and in response to receiving a last routing update, removing one or more routes for the particular AFI that are still marked as stale.

30. The method of claim 29, further comprising sending an acknowledgment of the soft notification message.

* * * * *